(12) United States Patent
Wang et al.

(10) Patent No.: US 8,454,918 B2
(45) Date of Patent: Jun. 4, 2013

(54) NANOPOROUS MATERIALS AND RELATED METHODS

(75) Inventors: Shiho Wang, Sunnyvale, CA (US);
Jaspal Singh, San Jose, CA (US); Vinod M. P. Nair, Concord, CA (US)

(73) Assignee: Nanotune Technologies Corp., Mountain View, CA (US)

( * ) Notice: Subject to any disclaimer, the term of this patent is extended or adjusted under 35 U.S.C. 154(b) by 822 days.

(21) Appl. No.: 12/482,070

(22) Filed: Jun. 10, 2009

(65) Prior Publication Data
US 2009/0305026 A1 Dec. 10, 2009

Related U.S. Application Data

(60) Provisional application No. 61/060,449, filed on Jun. 10, 2008, provisional application No. 61/060,451, filed on Jun. 10, 2008.

(51) Int. Cl.
| | |
|---|---|
| *C01B 33/12* | (2006.01) |
| *C01B 33/152* | (2006.01) |
| *C01B 33/155* | (2006.01) |
| *B01D 21/01* | (2006.01) |
| *B01J 13/00* | (2006.01) |
| *C08J 3/02* | (2006.01) |

(52) U.S. Cl.
USPC .............................. 423/338; 516/98; 516/111

(58) Field of Classification Search
USPC ................. 423/338; 516/98, 111, 112; 501/1, 501/153, 154
See application file for complete search history.

(56) References Cited

U.S. PATENT DOCUMENTS

| | | | |
|---|---|---|---|
| 4,849,378 A | 7/1989 | Hench et al. | |
| 4,851,150 A | 7/1989 | Hench et al. | |
| 4,851,373 A | 7/1989 | Hench et al. | |
| 5,023,208 A | 6/1991 | Pope et al. | |
| 5,071,674 A | 12/1991 | Nogues et al. | |
| 5,076,980 A * | 12/1991 | Nogues et al. | 264/621 |
| 5,196,382 A | 3/1993 | Hench et al. | |
| 5,206,189 A * | 4/1993 | Caldwell | 501/12 |

(Continued)

FOREIGN PATENT DOCUMENTS
WO WO-2006/068797 6/2006

OTHER PUBLICATIONS

Siouffi, A.-M. "Silica gel-based monoliths prepared by the sol-gel method: facts and figures", Journal of Chrmatography A, 1000 (2003) 801-818.*

(Continued)

*Primary Examiner* — Anthony J Zimmer
(74) *Attorney, Agent, or Firm* — Morrison & Foerster LLP

(57) ABSTRACT

Nanoporous sol-gel derived monoliths and methods for making nanoporous sol-gel derived monoliths are provided. The methods enable fine control over pore size and pore size distribution, e.g., so that pore sizes can be predetermined and precisely tuned over a range from 0.3 nm to about 30 nm, or over a range from about 0.3 nm to about 10 nm. The monoliths may be derived from any suitable sol-gel, but in some instances they are derived from silica sol-gels. The sol-gel derived monoliths with finely tunable pore sizes and narrow pore size distributions may be used for a variety of applications, e.g., as substrates or templates for high surface area electrodes, as substrates for high surface area sensor, or as a component in a filtration apparatus.

28 Claims, 10 Drawing Sheets

U.S. PATENT DOCUMENTS

| | | | |
|---|---|---|---|
| 5,243,769 | A | 9/1993 | Wang et al. |
| 5,264,197 | A | 11/1993 | Wang et al. |
| 5,306,555 | A * | 4/1994 | Ramamurthi et al. ........... 442/63 |
| 5,343,633 | A | 9/1994 | Wang et al. |
| 5,356,667 | A | 10/1994 | Hench et al. |
| 5,750,085 | A | 5/1998 | Yamada et al. |
| 5,958,577 | A * | 9/1999 | Sugimoto et al. ............. 428/333 |
| 6,183,908 | B1 | 2/2001 | Miyasaka et al. |
| 6,187,061 | B1 | 2/2001 | Amatucci et al. |
| 6,391,418 | B1 | 5/2002 | Ueda et al. |
| 6,511,645 | B1 | 1/2003 | Nesbitt et al. |
| 6,515,845 | B1 | 2/2003 | Oh et al. |
| 6,620,368 | B1 | 9/2003 | Wang et al. |
| 6,627,252 | B1 | 9/2003 | Nanjundiah et al. |
| 6,676,993 | B2 | 1/2004 | Klare |
| 6,884,822 | B2 | 4/2005 | Wang et al. |
| 6,928,220 | B2 | 8/2005 | Wang et al. |
| 7,000,885 | B2 | 2/2006 | Wang et al. |
| 7,001,568 | B2 | 2/2006 | Wang et al. |
| 7,026,362 | B2 | 4/2006 | Wang et al. |
| 7,125,912 | B2 | 10/2006 | Wang et al. |
| 7,199,997 | B1 | 4/2007 | Lipka et al. |
| 2004/0058217 | A1 | 3/2004 | Ohlsen et al. |
| 2004/0096608 | A1 | 5/2004 | King et al. |
| 2005/0136348 | A1 | 6/2005 | Wu et al. |
| 2006/0083914 | A1 | 4/2006 | Wang et al. |
| 2007/0082255 | A1 | 4/2007 | Sun et al. |
| 2007/0082966 | A1 | 4/2007 | Bowman et al. |
| 2009/0294088 | A1 | 12/2009 | Landingham et al. |
| 2009/0303660 | A1 | 12/2009 | Nair et al. |
| 2011/0223331 | A1 | 9/2011 | Martin et al. |

OTHER PUBLICATIONS

Kirkbir et al., "Drying and Sintering of Sol-Gel Derived Large SiO2 Monoliths", Journal of Sol-Gel Science and Technology 6, 203-217 (1996).*

Balducci et al. (2006). "The use of ionic liquids as solvent-free green electrolytes for hybrid supercapacitors," Applied Physics A: Materials Science & Processing, 82(4):627-632.

Bonnefoi et al. (1999). "Electrode optimisation for carbonpowersupercapacitors," J. Power Sources 79(1):37-42.

Elam et al. (2006). "Atomic Layer Deposition for the Conformal Coating of Nanoporous Materials," J. Nanomaterials vol. 2006, 5 pages.

Elmer et al, Thin Solid Films, 247 (1994), 15-23.

Lin and J.A. Ritter (1997). "Effect of synthesis pH on the structure of carbon xerogels ," Carbon 35(9):1271-1278.

Lin et al. (2000). "Carbonization and activation of sol-gel derived carbon xerogels," Carbon V38(6):849-861.

Lin. J. A. Ritter and B.N. Popov (1999). "Correlation of Double-Layer Capacitance with the Pore Structure of Sol-Gel Derived Carbon Xerogels", J. Electrochem. Soc., 146 3639-3643.

Miller and Burke (2008). "Electrochemical Capacitors: Challenges and Opportunities for Real-World Applications," The Electrochemical Society Interface Spring 2008, 53-57.

Ning et al. (1997). "Preparation and characterization of ZnO:Al films by pulsed laser deposition," Thin Solid Films 307(1-2):50-53.

Park et al. (2005). "Characteristics of Organic Light Emitting Diodes with Al-Doped ZnO Anode Deposited by Atomic Layer Deposition," Japanese Journal of Applied Physics 44: L242-L245.

Silva et al. (Jul. 1999). "Influence of Processing Variables on the Pore Structure of Silica Gels Obtained with Tetraethylorthosilicate," *Mat. Res.* 2(3): 197-200.

International Search Report mailed on Sep. 17, 2009, for PCT Patent Application No. PCT/US09/46876, filed on Jun. 10, 2009, 1 page.

International Preliminary Report on Patentability issued on Dec. 14, 2010, for PCT Patent Application No. PCT/US09/46876, filed on Jun. 10, 2009, 11 pages.

International Search Report mailed on Aug. 6, 2009, for PCT Patent Application No. PCT/US2009/046894, filed on Jun. 10, 2009, 1 page.

International Preliminary Report on Patentability issued on Dec. 13, 2010, for PCT Patent Application No. PCT/US2009/046894, filed on Jun. 10, 2009, 11 pages.

Aida et al. (2001). "Photoluminescent Silicate Microsticks Containing Aligned Nanodomains of Conjugated Polymers by Sol-Gel-Based In Situ Polymerization," Angewandte Chemie International Edition, vol. 40, Issue 20, pp. 3803-3806.

Kulinowski et al. (2000). "Porous Metals from Colloidal Templates," Advanced Materials, vol. 12, Issue 11, pp. 833-838.

* cited by examiner

A

B

C      2 (9/16)"

1 (7/8)"      Glass slide (1/200)" thick

D

Both sides are treated to produce hydrophobic surfaces

NANOPOROUS MATERIALS AND RELATED METHODS

CROSS-REFERENCE TO RELATED APPLICATIONS

This application claims the priority benefit of U.S. provisional patent application Ser. Nos. 61/060,449, filed Jun. 10, 2008, and 61/060,451, filed Jun. 10, 2008, which are incorporated in their entirety by reference.

FIELD OF THE INVENTION

Described herein are methods for making monolithic silica sol-gel derived monoliths. The sol-gel derived monoliths have controlled-size or tuned nanopores, and may be used in a variety of applications, including filtration, optical materials, sensors, or as substrates or templates for high surface area electrodes.

BACKGROUND

Generally, a sol-gel process starts with forming a colloidal solution (a "sol" phase), and hydrolyzing and polymerizing the sol phase to form a solid but wet and porous "gel" phase. The gel phase can be dried monolithically in a controlled manner, but not under supercritical conditions, so that fluid is removed to leave behind a dry monolithic matrix having an open network of pores (a xerogel). The term "xerogel" as used herein is meant to refer to a gel monolith that has been dried under nonsupercritical temperature and pressure conditions. The dry gel monolith can then be calcined to form a solid glass-phase monolith with connected open pores. The dry gel monolith can be further densified, e.g., sintered, at elevated temperatures to convert the monolith into a porous or nonporous ceramic or glass, e.g., for forming oxide-based coatings or fibers for optical applications.

The pore size and distribution of pores in a xerogel can be varied by varying reaction parameters while forming the gel. For example, U.S. Pat. No. 4,851,150, U.S. Pat. No. 4,849,378, U.S. Pat. No. 5,264,197, U.S. Pat. No. 6,884,822, U.S. Pat. No. 7,001,568, U.S. Pat. No. 7,125,912, and International Patent Publication No. WO 2006/068797, each of which is hereby incorporated by reference herein in its entirety, describe a variety of methods for making sol-gel derived monoliths wherein in one or more reaction parameters is varied to control an average pore size and/or a pore size distribution.

Thus, a need exists for improved control over pore size and pore size distribution in silica sol-gel derived monoliths, e.g., to make narrower pore size distributions, and narrower pore size distribution in combination with small average pore size, e.g., 10 nm pore size or smaller.

SUMMARY OF THE INVENTION

In general, methods are provided herein for the preparation of nanoporous sol-gel derived monoliths with fine control to achieve a desired average pore size, e.g., an average pore size in a range from about 0.3 nm to about 30 nm, or from about 0.3 nm to about 10 nm. The methods also provide for the preparation of monoliths having narrow distributions of pore sizes, e.g., where at least about 50%, at least about 60%, at least about 70% or an even high percentage of pores in a monolith have a pore size within about 20%, or about 10% of an average pore size. The monoliths may be derived from any suitable sol-gel, but in some instances they are derived from silica sol-gels. These sol-gel derived monoliths with finely tunable pore sizes and narrow pore size distributions may be used for a variety of applications, e.g., as substrates or templates for high surface area electrodes, as substrates for high surface area sensors, or as a component in a filtration apparatus.

Various methods for making silica sol-gel derived monoliths are described. In one variation, these methods include hydrolyzing $SiO_2$ precursor with water in the presence of a catalyst to form a sol and gelling the sol. The gelled sol can then be dried to obtain a nanoporous $SiO_2$-containing monolith having a total pore volume between about 0.3 $cm^3/g$ to about 2.0 $cm^3/g$, and a predetermined average pore size in a range from about 0.3 nm to about 30 nm, with at least about 60%, or at least about 70% of pores having a dimension within about 20%, or within about 10% of the average pore size. The methods can be adapted for making a silica sol-gel derived monolith having a predetermined average pore size in a range from about 0.3 nm to about 10 nm.

The $SiO_2$ precursor used in the methods can be any suitable precursor, but in some instances, the precursor may comprise an alkylorthosilicate, e.g., tetramethylorthosilicate or tetraethylorthosilicate.

The catalyst used in the methods may be any suitable catalyst. In some variations the catalyst may comprise hydrofluoric acid and a second acid. The second acid may be a weak acid, e.g., acetic acid, citric acid, formic acid or mixtures thereof. The second acid may be an organic acid. In other variations, the second acid may be a strong acid, e.g., HCl, $H_2SO_4$, or $HNO_3$. In some variations, the catalyst comprises a weak acid, e.g., acetic acid, citric acid, formic acid, any other organic acid, or mixtures thereof.

Some methods may comprise hydrolyzing the $SiO_2$ precursor with water in the presence of the catalyst and a solvent to form the sol. In general, the solvent may be any water-miscible solvent, but in some cases the solvent may be an alcohol such as methanol or ethanol. In some variations, the sol is formed by mixing the $SiO_2$ precursor with water and a catalyst without adding a solvent into the sol. In some variations, the relative amount of water used is nonstoichiometric. The molar ratio of the water to the precursor in the mixture before hydrolysis may be about 3.0:1 or less, about 2.5:1 or less, about 2.25:1 or less, or about 2.0:1.

Other variations of methods for forming sol-gel derived monoliths are described here. These methods comprise reacting effective amounts of a sol-gel precursor and water in the presence of a catalyst to form a wet gel, the catalyst comprising a mixture of hydrofluoric acid and a weak acid, and drying the wet gel to form the sol-gel derived monolith. In these methods, a molar ratio of the hydrofluoric acid to the sol-gel precursor can be selected to achieve a preselected average pore size and/or pore size distribution in the sol-gel derived monolith. In some variations, the molar ratio of the hydrofluoric acid to the sol-gel precursor is selected in combination with the drying temperature and time profile to achieve a preselected average pore size and/or pore size distribution in the sol-gel derived monolith The sol-gel precursor may be any suitable precursor, but in some cases may comprise an alkylorthosilicate, e.g., tetramethylorthosilicate or tetraethylorthosilicate.

In these methods, any suitable weak acid may be used in combination with hydrofluoric acid as a catalyst to control the gelation process, texture of the silica nanoporous structure, and therefore pore size and pore size distribution in the monolith. For example, a weak acid may have a first $pK_a$ that is about 2 or greater, e.g., in a range from about 2 to about 5, or in a range from about 2 to about 4. The weak acid may, for example, comprise citric acid, acetic acid, formic acid, any other organic acid, or mixtures thereof.

Some variations of these methods may comprise reacting the sol-gel precursor and water in the presence of the catalyst and a solvent to form the wet gel. The solvent, if present, may be any suitable water-miscible solvent, e.g., an alcohol such as methanol or ethanol. In some variations, the methods may comprise reacting the $SiO_2$ precursor directly with water and a catalyst without adding a solvent into the reaction.

These methods may be adapted for achieving a preselected average pore size in a range from about 0.3 nm to about 100 nm, about 0.3 nm to about 30 nm, or about 0.3 nm to about 10 nm. Further, the methods may be adapted for achieving a pore size distribution in which at least about 50% of pores have a pore size within about 20%, or about 10% of an average pore size for any preselected average pore size. For example, the methods may be used to produce monoliths having a predetermined average pore size in a range from about 0.3 nm to about 10 nm, with at least about 50% of pores having a pore size within about 20%, or about 20% of the average pore size.

Still other methods for making silica sol-gel derived monoliths are described. These method variations include reacting effective amounts of an alkylorthosilicate and water in the presence of a catalyst to form a wet gel, and drying the wet gel. The catalyst comprises a mixture of hydrofluoric acid and a second acid, wherein a molar ratio of the second acid relative to the alkylorthosilicate is about $1\times10^{-3}$ or less, and a molar ratio of the hydrofluoric acid relative to the alkylorthosilicate is about $1\times10^{-2}$ or less and is selected to achieve a desired average pore size and/or desired pore size distribution in a monolith. The alkylorthosilicate used in these methods may comprise for example tetramethylorthosilicate or tetraethylorthosilicate. In some cases, the alkylorthosilicate, water and the catalyst may be reacted in the presence of a solvent, e.g., an alcohol, to form the wet gel. The second acid used in these method variations may be either a strong acid or a weak acid. If the second acid is a strong acid, it may be selected from the group consisting of HCl, $H_2SO_4$, and $HNO_3$. In some variations, the methods may comprise reacting the $SiO_2$ precursor directly with water and a catalyst without adding a solvent into the reaction In yet another variation, some methods for making a silica sol-gel derived monolith comprise tuning an average pore size and or pore size distribution in the monolith by reacting a silica sol-gel precursor with water in the presence of a catalyst that comprises at least two acids, and controlling a rate a pore formation with the catalyst. In these methods, at least one of the two acids is hydrofluoric acid, and a combined molar ratio of the at least two acids relative to the silicate precursor is about 0.02:1 or less, or about 0.01:1 or less. In some variations, a molar ratio of the hydrofluoric acid to the sol-gel precursor may be about 0.005:1 or less. The silica sol-gel precursor may comprise an alkylorthosilicate, e.g., tetramethylorthosilicate or tetraethylorthosilicate. The second acid used in these method variations may be either a strong acid or a weak acid. If the second acid is a strong acid, it may be selected from the group consisting of HCl, $H_2SO_4$, and $HNO_3$ These methods may comprise tuning the average pore size in the monolith in a range from about 0.3 nm to about 30 nm, or in a range from about 0.3 nm to about 10 nm. The methods may also comprise tuning the distribution of pore sizes in the monolith so that at least about 50% of pores have a pore size within about 20%, or about 10% of an average pore size. For example, the methods may comprising tuning the average pore size in the monolith in a range from about 0.3 nm to about 10 nm, and tuning the distribution of pore sizes in the monolith so that at least about 50% of pores have a pore size within about 20%, or about 10% of the average pore size.

Additional methods for making silica sol-gel derived monoliths are described here. These methods comprise tuning an average pore size and/or a pore size distribution in a silica sol-gel monolith by reacting a silica sol-gel precursor with water in the presence of a catalyst, and controlling a rate of pore formation with the catalyst. In these methods, the catalyst comprises hydrofluoric acid and a second acid, and at least one of the hydrofluoric acid and the second acid in the catalyst is present at a molar ratio relative to the silica sol-gel precursor that is about 0.001:1 or less. The silica sol-gel precursor used may be any suitable precursor, but may in some variations comprise an alkylorthosilicate such as tetramethylorthosilicate or tetraethylorthosilicate.

In some variations, the second acid may be present at a molar ratio relative to the precursor of about 0.001:1 or less. For these variations, the hydrofluoric acid may be present at a molar ratio relative to the precursor of about 0.02:1 or less. The second acid may be any suitable acid, e.g., a strong acid such as HCl, $H_2SO_4$, or $HNO_3$, or a weak acid such as a weak acid having a $pK_a$ in a range from about 2 to about 4. In other variations, the hydrofluoric acid may be present at a molar ratio relative to the precursor of about 0.001:1 or less.

Certain of these methods may comprise tuning an average pore size of the monolith in a range from about 0.3 nm to about 30 nm, or from about 0.3 nm to about 10 nm. The methods may also comprise tuning a pore size distribution in the monolith so that at least about 50% of pores have a pore size within about 20%, or within about 10% of an average pore size.

Still other methods for making sol-gel derived monoliths are described here. These methods comprise monitoring shrinkage of one or more physical dimensions of the monolith to determine an extent of reaction, e.g., to determine when shrinkage of a monolith has reached a plateau. Any suitable physical dimension can be monitored, e.g., a longitudinal dimension, a cross-sectional dimension, or a combination of a longitudinal dimension and a cross-sectional dimension. One or more physical dimensions may be monitored using any suitable contact or noncontact displacement measurement technique or tool. In general, the technique or tool used may be capable of measuring displacement to about 1 µm or less, about 0.5 µm or less, about 0.2 µm or less, or about 0.1 µm or less resolution. In some variations, a laser displacement measurement technique or tool may be used to monitor shrinkage. In some cases, a laser displacement tool capable of monitoring displacement in two dimensions may be used.

These methods may include monitoring a physical dimension of the monolith to determine when shrinkage of the monolith along one or more dimensions has reached a plateau, and heat treating the monolith to drive off any residual liquid remaining in the pores. Such a heat treatment may for example comprise two stages: a first stage to drive off residual molecular species remaining in the pores after shrinkage has reached a plateau, and a second stage to burn off chemisorbed species.

In certain variations, these methods may comprise monitoring shrinkage in an initial drying phase using a mass loss measurement, and monitoring shrinkage in a final shrinkage phase by measuring one or more physical dimensions of the monolith, e.g., by monitoring physical displacement to about 1 µm or less.

Monoliths having small average pore sizes and narrow pore size distributions may be obtained using these methods, e.g., an average pore size in a range from about 0.3 nm to about 10 nm with at least about 50%, at least about 60%, at least about 70%, or at least about 75% of pores within about 10%, or within about 20% of the average pore size.

Variations of nanoporous materials comprising sol-gel derived monoliths are provided here. For example, nanoporous sol-gel derived monoliths made according to any one of the above-described methods are provided. Further, nanoporous silica sol-gel derived monoliths having pore volumes between about 0.3 cm$^3$/g and about 2.0 cm$^3$/g and an average pore size from about 0.3 nm to about 30 nm, or about 0.3 nm to about 10 nm, with at least about 60%, or at least about 70% of pores having a size within about 20%, or within about 10%, of the mean pore dimension are described. In some variations, the porosity of the nanoporous silica sol-gels may be about 50% to about 90% by volume, e.g., about 50%, about 60%, about 70%, about 80%, or about 90%. Thus, the sol-gel derived monoliths may have a surface area of at least about 200 m$^2$/g, at least about 500 m$^2$/g, at least about 800 m$^2$/g, at least about 1000 m$^2$/g, at least about 1200 m$^2$/g, at least about 1500 m$^2$/g, at least about 2000 m$^2$/g, at least about 3000 m$^2$/g, at least about 4000 m$^2$/g, or at least about 5000 m$^2$/g. The nanoporous materials described herein may be adapted for a variety of uses, e.g., for use in a filtration apparatus, or for use as a high surface area template or substrate, such as a substrate for a high surface area electrode, or for use in a sensor device.

The invention also provide a mold for casting silica sol-gel wafers comprising a container which comprises multiple slots, each slot comprising opposing, closely-spaced parallel sidewalls and hydrophobic inner surfaces. In some variations, the sidewalls in the slots are created by removable dividers. Materials that may be used to form the container and/or the dividers include polyethylene, polystyrene, polytetrafluoroethylene, polymethylpentene, glass, or any combination thereof. In some variations, the spacing between the parallel sidewalls in the slots is set so that the resulting sol-gel wafer has a desired thickness, such as between about 1000 microns to about 100 microns. In some variations, a cross-sectional dimension in the slots is set so that the resulting sol-gel wafer has a desired cross-sectional dimension. For example, the resulting sol-gel wafer has cross-sectional dimensions of an electrode for use in a capacitor, an ultracapacitor, a battery, or a fuel cell. In some variations, the slots of the mold are filled with a gel formulation comprising a SiO$_2$ precursor, water, and a catalyst.

The invention also provides a method of casting silica sol-gel wafers comprising: a) casting a gel formulation into a mold comprising a container which comprises multiple slots, each slot comprising opposing, closely-spaced parallel sidewalls and hydrophobic inner surfaces, wherein the gel formulation comprises a SiO$_2$ precursor, water, and a catalyst; b) allowing the gel formulation to form a gel in the slots in the mold; and c) drying the gels to form silica sol-gel wafers in the slots of the mold or after being removed from the mold. Any gel formulations described herein may be used for casting silica sol-gel wafers in the mold.

DETAILED DESCRIPTION

Figure 1:
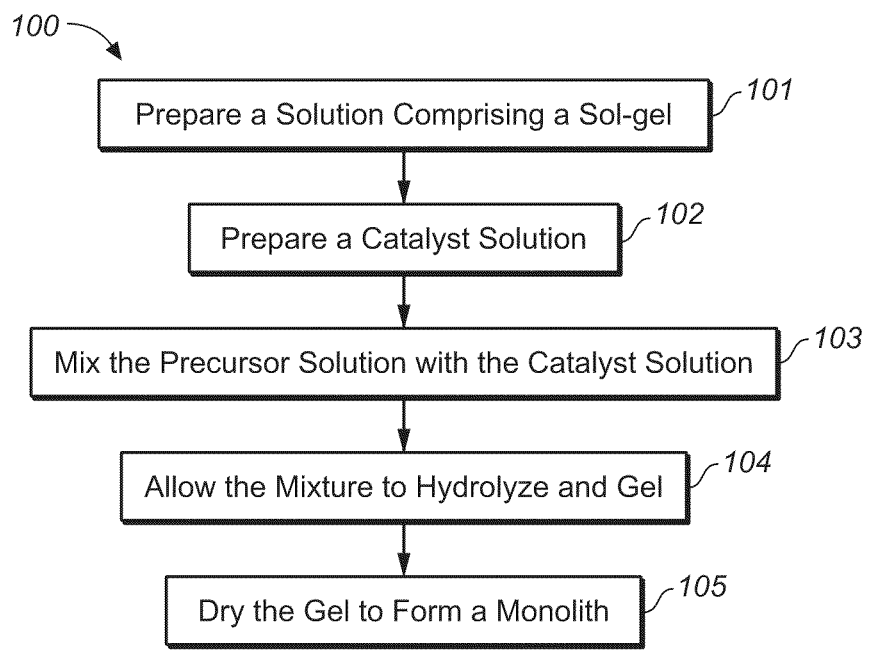
FIG. 1 illustrates an example of a method for making a sol-gel derived monolith as described herein.

In general, nanoporous materials and related methods are provided herein. The methods allow the preparation of nanoporous sol-gel derived monoliths with fine control/tune to achieve a precise, predetermined average pore size in the monoliths. As used herein "average pore size" is meant to encompass any suitable representative measure of a dimension of a population of pores, e.g., a mean, median, and/or mode cross-sectional dimension such as a radius or diameter of that population of pores. The mean pore size, median pore size, and mode pore size of a pore size distribution in a monolith may be essentially equivalent, e.g., by virtue of a very narrow and/or symmetrical pore size distribution. The methods may allow tuning an average pore size (such as average pore diameter) within a range from about 0.3 nm to about 30 nm, or within a range from about 0.3 nm to about 10 nm. For a given preselected average pore size, the methods also allow preparation of monoliths having narrow distributions of pore sizes around that average, e.g., where at least about 50%, at least about 60%, at least about 70%, or an even high percentage of pores, e.g., at least about 75%, in a monolith have a pore size within about 20%, or about 10% of an average pore size. Because the monoliths may be prepared to have small, well-controlled pore sizes, the open pore networks of the monoliths may have high surface areas, e.g., at least about 200 m$^2$/g, at least about 500 m$^2$/g, at least about 1000 m$^2$/g, or even higher, e.g., at least about 1500 m$^2$/g, at least about 2000 m$^2$/g, at least about 3000 m$^2$/g, at least about 4000 m$^2$/g, or at least about 5000 m$^2$/g. The nanoporous monoliths described herein may be derived from any suitable sol-gel, but in some instances they are derived from silica sol-gels.

The sol-gel derived monoliths with finely tunable pore sizes and narrow pore size distributions may be used for a variety of applications, e.g., as high surface area substrates or templates that can be used for high surface area electrodes, or in sensor devices requiring high surface area substrates. The monoliths may also be used in separation techniques or apparatus, e.g., as a component in a filtration apparatus.

As used herein, the term "nanoporous materials" is meant to encompass materials having pores ("nanopores") having a dimension, e.g., a cross-sectional diameter, in a range from about 0.1 nm to about 100 nm. Ranges as used herein are meant to be inclusive of any end points to the ranges indicated, as well as numerical values in between the end points.

It should also be noted that as used herein and in the claims, the singular forms "a," "an," and "the" include plural referents unless the context clearly indicates otherwise.

It is understood that aspect and variations of the invention described herein include "consisting" and/or "consisting essentially of" aspects and variations.

In some variations, reference to "about" a value or parameter refers to variation in the numerical quantity that can occur, for example, through typical measuring and handling procedures used; through inadvertent error in these procedures; and through differences in the manufacture, source, or purity of the compounds employed to make the compositions or carry out the methods. Reference to "about" a value or parameter herein includes (and describes) embodiments that are directed to that value or parameter per se. For example, description referring to "about X" includes description of "X."

In general, the microstructure of sol-gel derived monoliths described herein may be characterized in terms of a total pore volume, referring to a total volume of pores per unit mass, a surface area, referring to a surface area within the open network of pores per unit mass, a porosity, referring to fraction of the total volume of a monolith occupied by open pores, an average pore size, referring to an average (e.g., mean, median or mode) cross-sectional dimension (e.g., diameter or radius) of pores in a monolith, and a pore size distribution. The bulk surface area of a monolith may be measured in m²/g, and may be measured for example by using B.E.T. (Brunauer, Emmett and Teller) surface analysis techniques. In general, multiple point B.E.T. analysis may be performed to determine the bulk surface area. An average pore size, a pore size distribution, and a total pore volume may be measured by an analyzer capable of resolving pore sizes to 0.3 nm or smaller, e.g., Quantachrome Quadrasorb™ SI-Krypton/Micropore Surface Area and Pore Size Analyzer, available from Quantachrome Instruments, Quantachrome Corporation (http://www.quantachrome.com, last visited May 11, 2008). The total pore volume may be measured in cm³/g, and is the inverse of the bulk density of a monolith.

A population of pores can be modeled as a set of spheres each having a diameter (d) equal to an average pore size for that population, which may be measured with a pore size analyzer as described above, an individual pore surface area (A=π·d²), and an individual pore volume (V=(⅙)·π·d³). A calculated bulk surface area (SA) may be determined using the density ρ of a material making up the sol-gel matrix (e.g., for silica sol-gel, the density of silica forming the matrix is 2.1-2.2 g/cm³) and the following relationship in Equation 1:

SA=(1/ρ)[A/V].    (Eq. 1).

A calculated bulk density (ρ$_B$) of the monolith may be determined from the total pore volume (TPV) and the density ρ of a material making up the sol-gel matrix using the following relationship in Equation 2:

ρ$_B$=1/[(1/ρ)+TPV]    (Eq. 2).

Thus, the fraction of pores (porosity), or % pores (by volume) in a monolith may be given by TPV/[(1/p)+TPV].

In general, the monoliths described herein can be formed by hydrolyzing a precursor. The microstructure of the sol-gel derived monoliths described here may be affected, and therefore controlled by, rates of hydrolysis and polymerization. The precursor can be any suitable precursor, e.g., a metal- or metalloid-containing compound having ligands or side groups that can be hydrolyzed to form a sol, and then polymerized (gelled) to form a sol-gel. As is discussed in more detail herein, the hydrolysis and polymerization process can be catalyzed using a catalyst in solution.

FIG. 1 provides a flow diagram of an example of a method for forming a sol-gel derived monolith. There, method 100 comprises preparing a precursor solution as shown in step 101, and preparing a catalyst solution as shown in step 102. The precursor solution and the catalyst solution may be mixed together to form a reaction (step 103). The solution used in the reaction mixture in step 103 may be aqueous, or may comprise one or water-miscible organic solvents in combination with water. For example, an alcohol such as methanol, ethanol, or any alcohol having the general formula $C_nH_{2n+1}OH$, where n may be for example 0 to 12. Alternatively or in addition, formamide may be used in reaction mixture. The hydrolysis and polymerization reaction process may be allowed to proceed (step 104). After the wet gel is formed, the gel may be dried to form a monolith (step 105). It should be noted that the steps illustrated in method 100 need not be performed in any particular order, and steps may be combined together. For example, steps 101 or 102 may be reversed, or steps 101 and 102 may be combined into a single step, or steps 101, 102, and 103 may be completed simultaneously. Each of the steps in the methods is described in more detail below.

Non-limiting examples of hydrolyzable side group that can be used in precursors include hydroxyl, alkoxy, halo, and amino side groups. In many cases, silica ($SiO_2$) sol-gels may be formed, e.g., using alkylorthosilicate, fluoralkoxysilane, or chloroalkoxysilane precursors. However, in other cases, sol-gels based on germanium oxide, zirconia, titania, niobium oxide, tantalum oxide, tungsten oxide, tin oxide, hafnium oxide, alumina, or combinations thereof may be formed using appropriate precursors. For example, germanium alkoxides, e.g., tetratheylorthogermanium (TEOG), zirconium alkoxides, titanium alkoxides, vanadium alkoxides, or aluminum alkoxides may be used as precursors to form sol-gels incorporating the respective metal or metalloid elements.

As stated above, silica sol-gels may be formed using alkylorthosilicates as precursors, e.g., tetraethylorthosilicate (TEOS) or tetramethylorthosilicate (TMOS). In general, the stoichiometric hydrolysis reaction to form the sol can be described as:

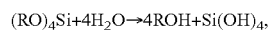

where R may for example be an ethyl group or a methyl group. Following this hydrolysis step, gelation can occur, in which the Si(OH)$_4$ condenses and polymerizes to form a network of $SiO_2$ and $H_2O$. The $SiO_2$ network so formed comprising open-necked pores, and $H_2O$ may be present in the open pores. The reaction as described above is aqueous, and may comprise one or more water-miscible organic solvent in combination with water. In some variations, one or more water-miscible organic solvent is not added into the reaction. For example, an alcohol such as methanol, ethanol, or any alcohol having the general formula $C_nH_{2n+1}OH$, where n may be for example 0 to 12. Alternatively or in addition, formamide may be used in the hydrolysis of the precursors. Two competing mechanisms may be operative that affect the microstructure of the monolith: formation of isolated silica particles, and formation of silica chains that form a fibril-like network.

The $SiO_2$ precursor may be hydrolyzed under either nonstoichiometric or stoichiometric hydrolysis conditions. In some variations, the molar ratio of water to the precursor is about 3:1 or less, about 2.5:1 or less, about 2.25:1 or less, or about 2:1. In some variations, the $SiO_2$ precursor is directly hydrolyzed with water and a catalyst in the absence of a solvent.

Catalysts can be used to adjust, e.g., increase, the rate of hydrolysis and polymerization, and correspondingly adjust the rate of gel formation. As is discussed in more detail herein, a reaction temperature or temperature profile can also be used to adjust a rate of gel formation. A catalyst may be an acid or a base. In some variations, a catalyst may comprise a first acid and a second acid, where the second acid catalyzes the hydrolysis reaction, and the first acid is capable of etching, dissolving, and/or redepositing in the sol matrix (e.g., a $SiO_2$ matrix), which may have the effect of increasing size of redeposited nanoparticles in the sol-gel matrix formation, leading to correspondingly increased nanopores size. Thus, the second acid of the catalyst may be added first to the sol-gel precursors to activate hydrolysis, and the first acid may be added subsequently to tune the pore size in the sol-gel. In other variations, the first and second acids of the catalyst may be added simultaneously. Of course, the first acid and/or the second acid of the catalyst may comprise a mixture of acids. In certain instances, the first acid, e.g., a matrix (e.g., $SiO_2$) dissolving component, of the catalyst may comprise hydrofluoric acid (HF), or a source of HF. HF sources that may be used include suitable fluorine-containing compounds that can produce HF during hydrolysis, or during polymerization (gelation). Non-limiting examples of such HF producing compounds include fluorine gas, Group I fluorides, e.g., KF, Group I hydrogen difluorides, e.g., $KHF_2$, Group II fluorides, Group III fluorides, e.g., $BF_3$, Group IV fluorides, e.g., $SiF_4$ or $GeF_4$, Group IV fluorosilanes, e.g., $SiFH_3$, $SiF(OC_2H_5)_3$, $SiFCl_2(OC_2H_5)$, Group IV fluorogermanes, e.g., $GeFH_3$, $GeF(OC_2H_5)_3$, Group V fluorides, e.g., $NF_3$, $PF_3$, $PF_5$, $PF_3Cl_2$, Group VI fluorides such as $SF_4$ or $SF_6$, fluoride salts such as $NH_4HF_2$, or mixtures or complexes thereof. A fluorosilane such as $SiF(OC_2H_5)_3$ may be used as a source of tetraethylorthosilicate precursor to the $SiO_2$ gel, and also as a source of HF.

Fine tuning of an average pore size and/or a pore size distribution in the resulting monolith may be accomplished by varying any one or any combination of the following reaction conditions: an amount of HF relative to a precursor; an amount of $H_2O$ relative to a precursor; an amount of a solvent relative to a precursor; varying an amount of a second acid relative to a precursor; an amount of a second acid relative to an amount of HF; and/or a reaction temperature. The relative amounts of the precursor, $H_2O$ and solvent, if present, may be stoichiometric or nonstoichiometric.

Further, the properties of the second acid, e.g., a first $pK_a$, may be selected to control at least one of an average pore size and a pore size distribution, and in some cases an average pore size and a pore size distribution associated with that average pore size. For example, a strong acid, e.g., an acid having a first $pK_a$ that is lower about −1 or lower, e.g., HCl, $H_2SO_4$, $HNO_3$, or a combination thereof, may be used as a second acid in addition to HF to catalyze the hydrolysis and/or the gelation processes. In some variations, a weak acid, e.g., an acid having a first $pK_a$ that is about 2 or greater, e.g., about 2 to about 5, or about 2 to about 4. For example, citric acid, acetic acid, formic acid, or combinations thereof, may be used as a second acid in addition to HF as a catalyst. In some variations, the second acid is an organic acid (e.g., citric acid, acetic acid, formic acid) which can be removed or burned from the gelled sol during the drying process. In certain variations, an intermediate acid, e.g., an acid having a first $pK_a$ that is between −1 and 2, e.g., oxalic acid, mellitic acid, or ketomalonic acid, may be used in combination with HF.

Figure 2A:
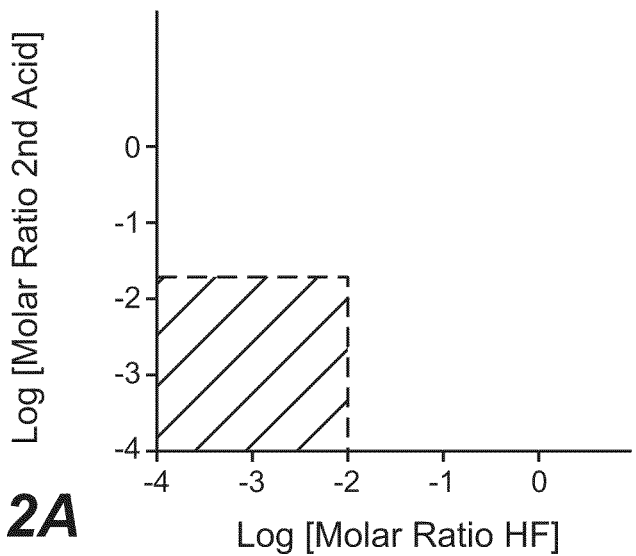
FIG. 2A provides a graphical illustration of a range of possible combinations of acids that may be used as a catalyst for non-stoichiometric hydrolysis of a sol-gel precursor.

In general, narrow pore size distributions with a tunable average pore size may be produced by hydrolyzing and polymerizing the precursor in the presence of a relatively low amount of HF compared to the precursor. For example, if a non-stoichiometric amount of water relative to precursor is used, e.g., by using 2 moles of water relative to one mole of a precursor such as TEOS or TMOS, the molar ratio of HF to the precursor used in the methods described herein may be about 0.01:1 or less, e.g., about 0.01:1, about 0.009:1, about 0.008:1, about 0.007:1, about 0.006:1, about 0.005:1, about 0.004:1, about 0.003:1, about 0.002:1, or about 0.001:1. In another example, if a non-stoichiometric amount of water relative to a precursor is used, e.g., 2.25 moles of water relative to one mole of a precursor such as TEOS or TMOS, the molar ratio of HF to the precursor used in the methods may be about 0.1:1, about 0.09:1, about 0.085:1, about 0.08:1, about 0.075:1, about 0.07:1, about 0.065:1, about 0.06:1, about 0.055:1, about 0.05:1, about 0.045:1, or about 0.4:1. For these non-stoichiometric situations, a molar ratio of the second acid to the starting material (e.g., the precursor) may be about 0.075:1, about 0.07:1, about 0.065:1, about 0.06:1, about 0.055:1, about 0.05:1, about 0.04:1, about 0.03:1, about 0.02:1, about 0.018:1, about 0.015:1, about 0.01:1, about 0.008:1, about 0.005:1, about 0.003:1, or about 0.001:1. The second acid in these instances may be any suitable acid, e.g., a strong acid (such as HCl, $H_2SO_4$, $HNO_3$, or a combination thereof), a weak acid (such as citric acid, acetic acid, formic acid, or a combination thereof), or an intermediate acid. FIG. 2A illustrates combinations of molar ratios of HF and a second acid that may be used for sol-gel reactions involving non-stoichiometric relationships between a precursor (e.g., TEOS or TMOS) and water.

Figure 2B:
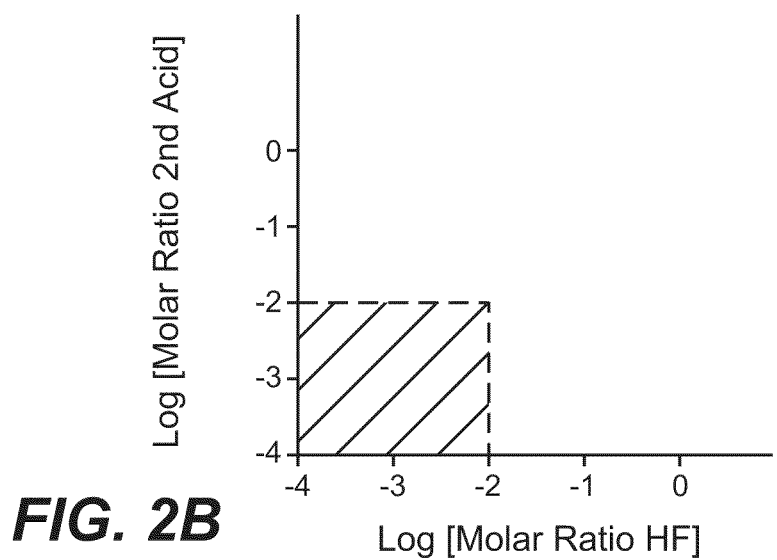
FIG. 2B provides a graphical illustration of a range of possible combinations of acids that may be used as a catalyst for stoichiometric hydrolysis of a sol-gel precursor.

If a stoichiometric amount of water relative to a precursor is used, a molar ratio of HF to precursor that is about 0.01:1 or less may be used, e.g., about 0.01:1, about 0.009:1, about 0.008:1, about 0.007:1, about 0.006:1, about 0.005:1, about 0.004:1, about 0.003:1, about 0.002:1, about 0.001:1, about 0.0005:1, or even less, and in some cases no HF may be used. In general, an amount of HF used in a catalyst may be increased to increase an average pore size. To achieve fine control of pore size and/or pore size distribution, the amount of HF may be adjusted using fine increments, e.g., by changing the molar ratio of HF relative to the precursor in increments of about 0.005 or about 0.001. A molar ratio of a second acid may be about 0.01:1 or less, e.g., about 0.01:1, about 0.009:1, about 0.008:1, about 0.007:1, about 0.006:1, about 0.005:1, or even less, and in some cases, no second acid may be used. Here again, the second acid may be any suitable acid, e.g., a strong acid such as HCl, $H_2SO_4$, $HNO_3$, or a combination thereof, a weak acid, or an intermediate acid. FIG. 2B provides a graphical illustration of combinations of molar ratios of HF and a second acid that may be used for sol-gel reactions involving stoichiometric relationships between a precursor (e.g., TEOS or TMOS) and water.

In certain variations, under either nonstoichiometric or stoichiometric hydrolysis conditions, the second acid may be a weak acid that has a first $pK_a$ of about 2 or higher, or about 3 or higher. Some of these weak acids may be organic acids, or small molecule acids. In some cases, the first $pK_a$ of the weak acid may be about 2 to about 5, e.g., about 2, about 2.5, about 3, about 3.5, about 4, about 4.5, or about 5. In certain variations, the first $pK_a$ of the weak acid may be about 2 to about 4. Non-limiting examples of weak acids that may be used include citric acid, acetic acid, formic acid, ascorbic acid, succinic acid, benzoic acid, acetoacetic acid, malic acid, pyruvic acid, vinyl acetic acid, tartartic acid, fumaric acid, phthalic acid, isophthalic acid, terephthalic acid, itaconic acid, hemimellitic acid, trimellitic acid, malonic acid, dicarboxylic acids such as methyl dicarboxylic acid, ethyl dicarboxylic acid, n-propyl dicarboxylic acid, isopropyl dicarboxylic acid, dimethyl dicarboxylic acid, methylethyl dicarboxylic acid, ethyl-n-propyl dicarboxylic acid, di-n-propyl dicarboxylic acid, glutaric acid, adipic acid, pimelic acid, suberic acid, amino acids such as alanine, aspartic acid and glutamic acid.

Figure 2C:
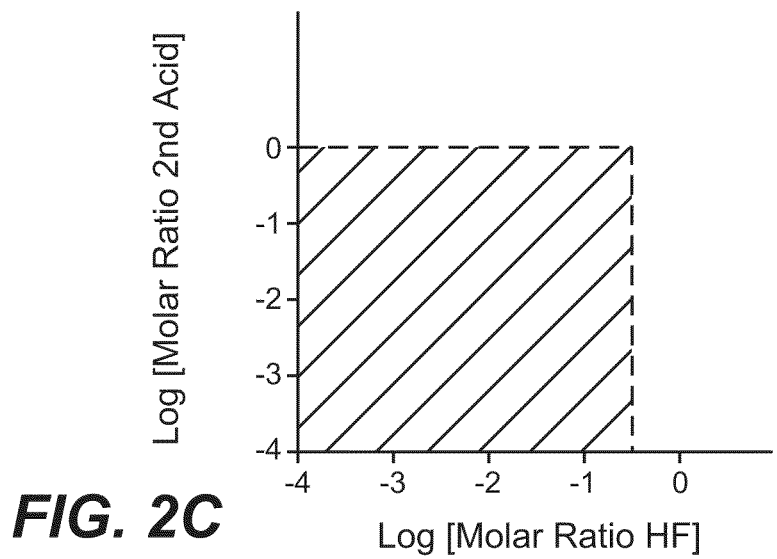
FIG. 2C provides a graphical illustration of a range of possible combinations of a weak acid and hydrofluoric acid that may be used as a catalyst for non-stoichiometric or stoichiometric hydrolysis of a sol-gel precursor.

For a weak acid is used in combination with HF as a catalyst under either stoichiometric or nonstoichiometric hydrolysis conditions, the molar ratio of the HF to the precursor (e.g., TEOS or TMOS) may be about 0.5:1 or less, e.g., about 0.1:1, about 0.09:1, about 0:085:1, about 0.08:1, about 0.075:1, about 0.07:1, about 0.065:1, about 0.06:1, about 0.055:1, about 0.05:1, about 0.045:1, about 0.04:1, about 0.035:1, about 0.03:1, about 0.025:1, about 0.02:1, about 0.015:1, about 0.01:1, about 0.009:1, about 0.008:1, about 0.007:1, about 0.006:1, about 0.005:1, about 0.004:1, about 0.003:1, about 0.002:1, about 0.001:1, or even less, e.g., about 0.0009:1, about 0.0008:1, about 0.0007:1, about 0.0006:1, about 0.0005:1, about 0.0004:1, about 0.0003:1, about 0.0002:1, about 0.0001:1, about 0.00005:1, or about 0.00001:1. Here again, the molar ratio of HF can be increased to increase pore size. As indicated above, very small adjustments in HF mole ratio, e.g., in about 0.005 increments, about 0.001 increments, about 0.0005 increments, about 0.0001 increments, about 0.00005 increments, or about 0.00001 increments, may be made to finely tune pore size. The molar ratio of the weak acid (relative to the precursor) that used in combination with the HF may be any suitable ratio, but in some cases may be about 1:1 or less, e.g., about 0.5:1, about 0.2:1, about 0.1:1, about 0.09:1, about 0.08:1, about 0.07:1, about 0.06:1, about 0.05:1, about 0.04:1, about 0.03:1, about 0.02:1, about 0.01:1, about 0.009:1, about 0.008:1, about 0.007:1, about 0.006:1, about 0.005:1, about 0.004:1, about 0.003:1, about 0.002:1, about 0.001:1, or even less, e.g., about 0.0009:1, about 0.0008:1, about 0.0007:1, about 0.0006:1, about 0.0005:1, about 0.0004:1, about 0.0003:1, about 0.0002:1, about 0.0001:1, about 0.00005:1, or about 0.00001:1. Here again, very small adjustments in the weak acid ratio, e.g., in about 0.005, about 0.001, about 0.0005, about 0.0001, about 0.00005, or about 0.00001 increments. In some situations, lesser amounts of a relatively strong weak acid, e.g., a weak acid having a $pK_a$ close to 2 may be used compared with a weak acid having a higher $pK_a$, e.g., a $pK_a$ close to 3 or 4. Thus, a molar ratio of a weak acid to HF may range from about 1000:1 to about 0.001:1, e.g., about 1000:1, about 100:1, about 10:1, about 1:1, about 0.1:1, about 0.01:1, or about 0.001:1. FIG. 2C shows a graphical illustration of combinations of molar ratios of HF and weak acids that may be used as a catalyst to make the sol-gel derived monoliths described herein. As indicated above, more than two acids may be used in combination with HF as a catalyst, e.g., two or more weak acids may be used in combination with HF.

In some cases, the methods for tuning an average pore size and/or a pore size distribution in a silica sol-gel monolith using a catalyst that comprises at least two acids, wherein one of the two acids is hydrofluoric acid, may comprise using a combined molar ratio of the at least two acids relative to a precursor that is about 0.03:1 or less, e.g., about 0.03:1, about 0.02:1, about 0.01:1, about 0.008:1, about 0.007:1, about 0.006:1, about 0.005:1, about 0.004:1, about 0.003:1, or about 0.002:1. For example, in some instances HF having a molar ratio of about 0.03:1, about 0.025:1, about 0.02:1, about 0.015:1, about 0.01:1, about 0.009:1, about 0.008:1, about 0.007:1, about 0.006:1, about 0.005:1, about 0.004:1, about 0.003:1, about 0.002:1, about 0.001:1, about 0.0009:1, about 0.0008:1, about 0.0007:1, about 0.0006:1, about 0.0005:1, about 0.0004:1, about 0.0003:1, about 0.0002:1, about 0.0001:1, or even lower, e.g., about 0.00005:1 or 0.00001:1, may be used in combination with a molar ratio of a second acid of 0.001:1. In these variations, the second acid may be any suitable acid, e.g., a strong acid such as HCl, $H_2SO_4$, $HNO_3$, or combinations thereof, or an intermediate acid such as oxalic acid, mellitic acid, ketomalonic acid, or combinations thereof, or a weak acid such as acetic acid, citric acid or combinations thereof.

In certain cases, the methods for tuning an average pore size and/or a pore size distribution in a silica sol-gel monolith using a catalyst that comprises hydrofluoric acid and a second acid, wherein at least one of the hydrofluoric acid and the second acid is used in a molar ratio that is about 0.001:1 or less relative to a sol-gel precursor, e.g., a silicate sol-gel precursor as described herein or otherwise known. In these variations, the hydrofluoric acid may be present at a molar ratio of about 0.01:1 to about 0.001:1, or about 0.01:1 to about 0.0001:1, and the second acid may be present in a molar ratio of about 0.0001:1 or less. For example, a molar ratio of the hydrofluoric acid may be about 0.0001:1, about 0.0005:1, about 0.001:1, about 0.005:1, about 0.01:1, about 0.015:1, about 0.02:1, about 0.025:1, or about 0.03:1 when a molar ratio of the second acid is about 0.001:1 or less. In other variations, the molar ratio of the hydrofluoric acid may be about 0.001:1 or less, or about 0.0001:1 or less, whereas the molar ratio of the second acid is equal to or greater than 0.001:1, e.g., about 0.001:1, about 0.005:1, about 0.01:1, about 0.02:1, or about 0.03:1. In these examples, the second acid may be any suitable acid, e.g., one or more strong acids as disclosed herein or otherwise known, or one or more intermediate acids as disclosed herein or otherwise known, or one or more weak acids as disclosed herein or otherwise known.

For any of the methods described here, a temperature or temperature profile used in the hydrolysis and polymerization process used in making the wet porous gel monoliths may be varied to tune a reaction rate, which can in turn affect monolith microstructure. Thus, different temperatures or temperature profiles may be used, and may depend on a catalyst selected. In some situations, a temperature or temperature ramp that includes temperatures below ambient may be used for gelation, e.g., as described in U.S. Pat. No. 6,884,822, which is incorporated herein by reference in its entirety. In other instances, elevated reaction temperatures may be used, which may be at least in part due to exothermic hydrolysis reaction. Reaction temperatures may range from about 0° C. to about 80° C., or from about 15° C. to about 125° C., or from about 45° C. to about 100° C. In some cases, a reaction temperature may be naturally ramped up during the hydrolysis process due to the exothermic reaction, e.g., from about 0° C. to about 100° C. over a period of about 1 to 2 hours. For example, an exothermic hydrolysis reaction solution may be mixed while the reaction temperature ramped from about 0° C. to about 70° C. over a period of about 1 to 2 hours. The mixture may then be cast into an appropriate mold and held at an appropriate temperature, e.g., from about 0° C. to about 70° C. (such as about 33° C.) for an additional 1 to 30 hours to allow further gelation. In some cases, the mixture may be held in a mold at about 20° C. for 1 to 2 hours to allow gelation, held at about 20° C. for an additional 12 to 24 hours to allow the gelled sol to begin shrinkage (e.g., about 0.5% to about 5% volume shrinkage), and then removed from the mold, or remained in the mold for further drying process.

As indicated above, the wet, porous monoliths as prepared by any of the methods provided above may be formed in a mold so that it may be dried in a desired shape and configuration. Any suitable molding method or technique, and any suitable drying method or technique as described herein, now known, or later developed, may be used to form and dry the wet gels formed herein. A mold for example may be formed of polyethylene, polystyrene, polytetrafluoroethylene (Teflon™), polymethylpentene (PMP), glass, or any combination thereof. Further, a mold surface may be treated or conditioned so as to impart a desired surface quality to the molded monolith, e.g., hydrophobically treated. For example, a mold surface may be chemically cleaned, physically cleaned, and/or have static charges removed.

Suitable examples of molding and drying techniques and methods are described in U.S. Pat. No. 6,884,822 entitled "Sol-Gel Process Utilizing Reduced Mixing Temperature," U.S. Pat. No. 6,620,368 entitled, U.S. Pat. No. 5,264,197 entitled "Sol-Gel Process for Providing a Tailored Gel Microstructure," U.S. Pat. No. 4,849,378 entitled "Ultraporous Gel Monoliths Having Predetermined Pore Sizes and Their Production," U.S. Pat. No. 4,851,150 entitled "Drying Control Additives for Rapid Production of Large Sol-Gel Derived Silicon, Boron and Sodium Containing Monoliths," U.S. Pat. No. 4,851,373 entitled "Large Sol-Gel $SiO_2$ Monoliths Containing Transition Metal and Their Production," U.S. Pat. No. 5,071,674 entitled "Method for Producing Large Silica Sol-Gel Doped with Inorganic and Organic Compounds," U.S. Pat. No. 5,196,382 entitled "Method for Production of Large Sol-Gel $SiO_2$ Containing Monoliths of Silica with and without Transition Metals," U.S. Pat. No. 5,023,208 entitled "Sol-Gel Process for Glass and Ceramic Articles," U.S. Pat. No. 5,243,769 entitled "Process for Rapidly Drying a Wet, Porous Gel Monolith," U.S. Pat. No. 7,000,885, entitled "Apparatus and Method for Forming a Sol-Gel Monolith Utilizing Multiple Casting," U.S. Pat. No. 7,001,568, entitled "Method of Removing Liquid from Pores of a Sol-Gel Monolith," U.S. Pat. No. 7,026,362, entitled "Sol-Gel Process Utilizing Reduced Mixing Temperatures," U.S. Pat. No. 7,125,912, entitled "Doped Sol-Gel Materials and Method of Manufacture Utilizing Reduced Mixing Temperatures", each of which is incorporated herein by reference in its entirety.

In general, a wet, porous monolith that has been placed in a mold may be held in a storage area under generally ambient conditions for about one to three days. After this initial period, the monolith may be removed from the mold or remained in the mold. Subsequently, a monolith may be dried under controlled, but not necessarily supercritical, drying conditions. The drying conditions can remove liquid, e.g., water and/or a solvent such as an alcohol from the interior of the porous network under controlled conditions such that the monolith does not crack and the integrity of the monolith remains intact. During drying, the monolith shrinks, and capillary forces in the pores increase as liquid is drawn out. Thus, any suitable drying temperature profile and/or drying atmosphere may be used with the monoliths formed such to avoid cracking of the monoliths, e.g., by keeping capillary forces due to the liquid being extracted below the limit of the pore walls to withstand such forces. The temperature profile used for drying can be adjusted so that the evaporation rate of liquid from the pores is approximately the same as or less than the diffusion rate of the liquid through the pores. In some cases, a modulated temperature profile (temperature cycling) may be used. Temperature cycling in some instances may reduce a drying time. Drying profiles may be used that allow drying of a monolith over a time period of a few days or less, e.g., within a week, or within 5 days, or within 3 days, or within 2 days, or within 1 day. As is described in more detail below, the extent of reaction (e.g., shrinkage) and drying may be monitored by weight loss, vapor pressure and/or physical (e.g., microscopic) inspection.

For example, monoliths as described here may be dried using the methods similar to those described in U.S. Pat. No. 6,620,368 which has already been incorporated herein by reference in its entirety. That is, a portion of the liquid (e.g., water and/or alcohol) in the pores of the wet monolith may be removed while the gel remains wet at least in an outer circumferential outer region of the monolith. Thus, the gel can dry more or less from the inside out, e.g., the outer peripheral region of the monolith may dry after an inner core region of the monolith has substantially dried.

In some cases, drying methods and techniques may be used that are similar to those described in U.S. Pat. No. 7,001,568, which has already been incorporated herein by reference in its entirety. That is, the monoliths may be dried by removing a portion of liquid, e.g., water and/or an alcohol such as ethanol, from pores of a body of a gel monolith while both an inner core region and an outer peripheral region of the gel remain wet. The gel may be allowed to shrink and become more dense while the inner core region and the outer peripheral region remain wet. After this initial partial drying procedure, the remainder of the liquid may be removed from the monolith by applying a modulated temperature gradient between the outer peripheral region and the inner core region.

As stated above, any suitable method, technique, instrument, or combination thereof may be used for monitoring the extent of reaction and corresponding monolith shrinkage, e.g., mass loss, vapor pressure, and/or physical inspection. It may be desired to monitor shrinkage using a relatively precise technique, as incomplete or nonuniform reaction or drying may lead to cracking, or may lead to broadened distributions of pore sizes. For example, shrinkage of the monolith may be monitored locally and microscopically over its body to gauge an extent and uniformity of shrinkage. Such microscopic monitoring may be conducted using any suitable tools or technique. Any technique that is capable of detecting and resolving micron sized or submicron sized distance changes may be suitable. For example, any type of displacement sensor that is capable of about 1 µm, about 0.5 µm, about 0.1 µm, or even finer resolution may be used. Contact or non-contact techniques may be used to monitor the drying of a monolith. Physical shrinkage measurements may be made on a continuous basis, or may be made at selected time intervals. Multiple displacement sensors may used, e.g., to measure displacement along different dimension such as a cross-sectional dimension (e.g., a width, diameter or radius) or a longitudinal dimension (e.g., a height or length). In some cases, multiple displacement sensors may be used to monitor shrinkage in different regions of a monolith. Linear, two-dimensional, or three-dimensional displacement sensing tools may be used. The monolith may be placed on a vibration-controlled support, e.g., an optical table, to improve accuracy and precision of displacement measurements.

Non-limiting examples of contact-type displacement sensors that may be used to monitor shrinkage of a monolith include dial indicators, linear variable differential transformers (LVDT), and differential variable reluctance transformers (DVRT). Non-limiting examples of non-contact displacement sensors that may be used include eddy-current (inductive) type magnetic field displacement sensors and optical displacement sensors. For example, any commercially-available laser displacement sensor that is capable of 1 µm or less resolution may be used. Laser displacement sensors may be scanning, e.g., to monitor a surface, or non-scanning varieties, e.g., to monitor a targeted position. Non-limiting examples of suitable vendors for contact and/or non-contact displacement sensors include Keyence, Inc. (www.sensor-central.com), Acuity, Inc. (www.acuity.com), Micro-Epsilon, Inc. (www.micro-epsilon.com), MTI Instruments, Inc. (www.mtiinstruments.com), Honeywell, Inc. (www.honeywell.com/sensing), Baumer, Ltd. (www.baumerelectric.com), Banner Engineering, Inc. (www.bannerengineering.com), and Microstrain, Inc. (www.microstrain.com). It may be desired to use a displacement measurement technique that is substantially temperature-sensitive or allows for temperature compensation, e.g., an optical displacement t sensor or a DVRT. Combinations of displacement sensor technologies may be used, e.g., one type may be used to monitor a longitudinal dimension, whereas another type of sensor may be used to monitor a cross-sectional dimension.

Thus, the shrinkage of one or more dimensions and/or one or more regions of a monolith may be monitored to detect a plateau in the shrinkage process. In many cases, shrinkage may be monitored at multiple positions to detect a plateau has been reached throughout the body of the monolith, instead of only in portions of the monolith. A plateau may be reached when shrinkage is less than about 100 ppm, less than about 5 ppm, less than about 1 ppm, or even less. For example, a plateau may be reached when dimensional changes are about 1 µm or less. In some cases, a relatively imprecise measurement technique such as mass loss may be used for monitoring an initial shrinkage phase, whereas a more precise monitoring technique as described above may be used for monitoring final shrinkage. The shrinkage may be carried out at a temperature in the range of about 70° C. to about 90° C. Generally, before reaching shrinkage plateau, no gas is used to purge the vapor out of the monolith.

Thus, the shrinkage and drying of the gels can be described in terms of a two phase treatment. In a first phase, the wet gel structure has reached its final shrinkage (e.g., monitored by physical displacement as described above) with its internal open pores still filled with its own pore liquid (e.g., molecular species such as water molecules and alcohol molecules). Thereafter, in a second phase, the monolith can be heated to remove any residual liquid in the pores. The heat treatment itself can include multiple heat treatment stages. In a first heat treatment stage, temperatures greater than the boiling point of the molecular species inside the porous gel structure may be used, e.g., to overcome capillary forces within the pores. In some cases, in this stage, a temperature ramp from about 80° C. to about 200° C., from about 90° C. to about 180° C., or from about 90° C. to about 120° C. may be used to drive off molecular water, alcohol (e.g., ethanol), and catalysts remaining in the pores. Thus, a temperature ramp from about 140° C. to about 200° C., about 200° C. to about 450° C., or from about 180° C. to about 400° C. may be used to burn off molecular water and alcohol (e.g., ethanol) remaining in the pores in a second heat treatment stage, as is described in more detail below. During the first heat treatment stage, the heating condition is sufficient to evaporate the molecular species from inside the pores, but is insufficient cause removal of chemisorbed molecular species. No purging gas is used before the pore liquid are totally evaporated to become vapor phase. A temperature ramp used any of the heat treatment stages may depend on the dimensions, especially a thickness, of a monolith, but for a rod-shaped or brick-shaped monolith having a thickness of several cm, this temperature ramp may occur over about 1 hour to about 2 hours. After all the pore liquid becomes vapor phase, a nitrogen atmosphere (or inert gas such as helium or argon), or air atmosphere may be used to purge or exchange vaporized pore liquid out. At this stage, the temperature is increased from 120° C. to 180° C. to get rid of all and any molecular water and alcohol inside the pore of gel.

As stated above, in a second heat treatment stage, chemisorbed species that still remain in the pores may be burned off in an air atmosphere. Thus, the temperatures used in this stage of the heat treatment may be sufficient to burn off chemisorbed alcohol or other organic species such as higher molecular weight alcohols that are still present in the pores, but insufficient to cause the pores to close. For the this stage, air or $N_2/O_2$ combination may be introduced at about 140° C. to about 200° C. or about 180° C. to about 200° C. and the temperature increased to a baking temperature in a range from about 400° C. to about 800° C., e.g., about 400° C., about 450° C., about 500° C., about 600° C., or about 700° C. The baking time for the second stage of the heat treatment may be varied based on a thickness of a monolith. For example, a block-shaped or rod-like monolith having a thickness of several centimeters may be baked for about 2 to about 5 hours. In some cases, the second stage of the heat treatment can form hydroxyl reaction sites, e.g., at a density of about 4 to about 6 hydroxyl groups per $nm^2$. Such hydroxyl reaction sites may be used for reactively coating a surface of the pores, e.g., applying conductive coating so that the monolith may be used as a substrate for a high surface area electrode, or attaching an analyte or other species so that the monolith may be used as a sensor.

In some variations, the invention provides a method of drying the gels described herein, the method comprising heating the gel that has reached shrinkage plateau at a temperature that the molecular species (including alcohol, water, and catalysts) are in vapor phase (e.g., at a temperature in the range of 90° C. to 120° C.); introducing a gas (such as nitrogen) to purge or exchange the vaporized molecular species out of the pores (e.g., at a temperature in the range of about 120° C. to about 180° C.); and burning the gel to remove chemisorbed species out the pores in the presence of $N_2/O_2$ combination or air (e.g., at a temperature in the range of about 140° C. to about 450° C.).

In some cases, a monolith may be sliced into thin wafers, e.g., wafers having a thickness of about 1 mm, about 0.9 mm, about 0.8 mm, about 0.7 mm, about 0.6 mm, about 0.5 mm, about 0.4 mm, about 0.3 mm. about 0.2 mm, about 0.15 mm, or about 0.1 mm. Any suitable slicing or cutting technique or tool may be used to form such wafers, e.g., a saw or any other kind of cutting tool, e.g., a wire saw, a diamond saw, or a water jet cutting tool. For thin wafers, the times for the heat treatment to drive off molecular species and/or burn chemisorbed species as described above may be dramatically reduced. For example, a 200 µm thick wafers may be baked at about 400° C., about 450° C., or about 500° C. for less than an hour, e.g., about 10 minutes, to burn off chemisorbed species.

In certain variations, thin wafers may be molded. For example, wafers may be formed by casting the gel formulation into a mold or container comprising multiple slots, each slot comprising opposing, closely-spaced parallel sidewalls and hydrophobic inner surfaces. The gel can then undergo shrinkage in the slots in the mold, as described above. The spacing between the parallel sidewalls in the slots can be set so that the resulting sol-gel wafer has a desired thickness, and a cross-sectional dimension of the slots can be selected so that the resulting sol-gel wafer has a desired cross-sectional area. After molding such sol-gel wafers, they can undergo further shrinkage and drying as described above. In some cases, the molded sol-gel wafers may undergo further shrinkage and drying while still in the mold, whereas in certain circumstances, the molded wafers may be removed from the mold to undergo one or more shrinkage or drying steps. As stated above, for thin wafers, the times for heat treatment for thin wafers may be shortened compared to those for block-like monoliths. Wafers may have a thickness of about 1 mm, about 0.9 mm, about 0.8 mm, about 0.7 mm, about 0.6 mm, about 0.5 mm, about 0.4 mm, about 0.3 mm. about 0.2 mm, about 0.15 mm, or about 0.1 mm. An example of the mold that may be used is shown in FIGS. 9A-9D.

In certain variations, one or more additional components may be added during the hydrolysis and polymerization of the gels described herein. For example, one or more drying control agents may be used, such as those described in U.S. Pat. No. 4,851,150, which has already been incorporated herein by reference in its entirety. Further, one or more porogens may be added, such as those described in International Patent Publication No. WO 2006/068797, which has already been incorporated herein by reference in its entirety.

The monoliths made according to the methods described herein may have microstructure having a desired microstructure and a desired surface area for the open network of pores. As stated above, the total pore volume of a monolith may be determined using a pore size analyzer such as a Quantachrome Quadrasorb™ SI Krypton/Micropore analyzer, and the bulk density of a monolith may then be calculated using the total pore volume and the density of the material making up the framework in the monolith. The monoliths according to the methods described here may have a total pore volume of at least about at least about 0.1 cm$^3$/g, at least about 0.2 cm$^3$/g, at least about 0.3 cm$^3$/g, at least about 0.4 cm$^3$/g, at least about 0.5 cm$^3$/g, at least about 0.6 cm$^3$/g, at least about 0.7 cm$^3$/g, at least about 0.8 cm$^3$/g, at least about 0.9 cm$^3$/g, at least about 1 cm$^3$/g, at least about 1.1 cm$^3$/g, at least about 1.2 cm$^3$/g, at least about 1.3 cm$^3$/g, at least about 1.4 cm$^3$/g, at least about 1.5 cm$^3$/g, at least about 1.6 cm$^3$/g, at least about 1.7 cm$^3$/g, at least about 1.8 cm$^3$/g, at least about 1.9 cm$^3$/g, at least about 2.0 cm$^3$/g, or even higher. Thus, some monoliths may have a total pore volume in a range from about 0.3 cm$^3$/g to about 2 cm$^3$/g, or from about 0.5 cm$^3$/g to about 2 cm$^3$/g, or from about 0.5 cm$^3$/to about 1 cm$^3$/g, or from about 1 cm$^3$/g to about 2 cm$^3$/g. A porosity of the monoliths may be about 30% to about 90% by volume, e.g., about 30% to about 80%, or about 40% to about 80%. In some variations, the porosity may be lower than about 30% by volume or higher than about 90% by volume, e.g., up to about 95% by volume.

An average pore size of the pores in the open pore network formed in the monoliths described herein may be tunable of a range from about 0.3 nm to about 100 nm, about 0.3 nm to about 50 nm, about 0.3 nm to about 30 nm, or about 03 nm to about 10 nm. For example average pore sizes of about 0.3 nm, about 0.5 nm, about 0.8 nm, about 1 nm, about 2 nm, about 3 nm, about 4 nm, about 5 nm, about 6 nm, about 7 nm, about 8 nm, about 9 nm, or about 10 nm may be preselected and achieved using the methods described herein. For any preselected average pore size achieved in the monoliths described herein, a relatively narrow distribution around that mean may be achieved. For example, at least about 50%, at least about 60%, at least about 70%, or at least about 75% of pores may be within about 40%, within about 30%, within about 20%, or within about 10% of a mean size. In certain variations, at least about 50%, at least about 60%, at least about 70%, or at least about 75% of pores may be within about 1 nm, within about 0.5 nm, within about 0.2 nm, or within about 0.1 nm of an average pore size. As used herein "within" a designated percentage or designated amount of an average pore size is meant to encompass that percentage deviation or a lesser percentage deviation, or that amount of deviation or a lesser amount of deviation to either the higher side or a lower side of the average pore size. That is, a pore size distribution that is within about 20% of an average pore size is meant to encompass pore sizes in a range from the average pore size minus 20% of that average pore size to the average pore size plus 20% of that average pore size, inclusive.

Thus, some variations of monoliths may have an average pore size that can be selected in a range from about 0.3 nm to about 30 nm or in a range from about 0.3 nm to about 10 nm, and a distribution such that at least about 50%, at least about 60%, at least about 70%, or at least about 75% of pores are within about 20% of the average pore size, or within about 10% of the average pore size. Certain variations may have even tighter pore size distributions, e.g., monoliths may have an average pore size selectable in a range from about 0.3 nm to about 30 nm or in a range from about 0.3 nm to about 10 nm, and have a distribution such that at least about 50%, at least about 60%, at least about 70%, or at least about 75% of pores are within about 10% of the average. For monoliths having relatively small average pore sizes, e.g., 5 nm or smaller, e.g., about 5 nm, about 4 nm, about 3 nm, about 2 nm, about 1 nm, about 0.5 nm, or about 0.3 nm, at least 50%, at least about 60%, at least about 70%, or at least about 75% of the pores may be within about 1 nm, about 0.5 nm, about 0.2 nm, or about 0.1 nm of the mean. Table 1 provides average pore sizes that may be achieved in the sol-gel derived monoliths described herein, and pore size distributions that may be associated with those average pores sizes.

TABLE 1

Pores sizes and pore size distributions

| Average Pore Size | Pore Size Distribution in a Monolith* | | | |
|---|---|---|---|---|
| | ≧50% Pores | ≧60% Pores | ≧70% Pores | ≧75% Pores |
| 0.3 nm-1 nm | +/−10% | +/−10% | +/−10% | +/−10% |
| 0.3 nm-1 nm | +/−20% | +/−20% | +/−20% | +/−20% |
| 0.3 nm-1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 1 nm-2 nm | +/−10% | +/−10% | +/−10% | +/−10% |
| 1 nm-2 nm | +/−20% | +/−20% | +/−20% | +/−20% |
| 1 nm-2 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 2 nm-3 nm | +/−10% | +/−10% | +/−10% | +/−10% |
| 2 nm-3 nm | +/−20% | +/−20% | +/−20% | +/−20% |
| 2 nm-3 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |

TABLE 1-continued

Pores sizes and pore size distributions

| Average Pore Size | Pore Size Distribution in a Monolith* | | | |
|---|---|---|---|---|
| | ≥50% Pores | ≥60% Pores | ≥70% Pores | ≥75% Pores |
| 3 nm-4 nm | +/−10% | +/−10% | +/−10% | +/−10% |
| 3 nm-4 nm | +/−20% | +/−20% | +/−20% | +/−20% |
| 3 nm-4 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 4 nm-5 nm | +/−10% | +/−10% | +/−10% | +/−10% |
| 4 nm-5 nm | +/−20% | +/−20% | +/−20% | +/−20% |
| 4 nm-5 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 5 nm-6 nm | +/−10% | +/−10% | +/−10% | +/−10% |
| 5 nm-6 nm | +/−20% | +/−20% | +/−20% | +/−20% |
| 5 nm-6 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 6 nm-7 nm | +/−10% | +/−10% | +/−10% | +/−10% |
| 6 nm-7 nm | +/−20% | +/−20% | +/−20% | +/−20% |
| 6 nm-7 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 7 nm-8 nm | +/−10% | +/−10% | +/−10% | +/−10% |
| 7 nm-8 nm | +/−20% | +/−20% | +/−20% | +/−20% |
| 7 nm-8 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 8 nm-9 nm | +/−10% | +/−10% | +/−10% | +/−10% |
| 8 nm-9 nm | +/−20% | +/−20% | +/−20% | +/−20% |
| 8 nm-9 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 9 nm-10 nm | +/−10% | +/−10% | +/−10% | +/−10% |
| 9 nm-10 nm | +/−20% | +/−20% | +/−20% | +/−20% |
| 9 nm-10 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 11 nm-12 nm | +/−10% | +/−10% | +/−10% | +/−10% |
| 11 nm-12 nm | +/−20% | +/−20% | +/−20% | +/−20% |
| 11 nm-12 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 12 nm-13 nm | +/−10% | +/−10% | +/−10% | +/−10% |
| 12 nm-13 nm | +/−20% | +/−20% | +/−20% | +/−20% |
| 12 nm-13 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 13 nm-14 nm | +/−10% | +/−10% | +/−10% | +/−10% |
| 13 nm-14 nm | +/−20% | +/−20% | +/−20% | +/−20% |
| 13 nm-14 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 14 nm-15 nm | +/−10% | +/−10% | +/−10% | +/−10% |
| 14 nm-15 nm | +/−20% | +/−20% | +/−20% | +/−20% |
| 14 nm-15 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 15 nm-16 nm | +/−10% | +/−10% | +/−10% | +/−10% |
| 15 nm-16 nm | +/−20% | +/−20% | +/−20% | +/−20% |
| 15 nm-16 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 16 nm-17 nm | +/−10% | +/−10% | +/−10% | +/−10% |
| 16 nm-17 nm | +/−20% | +/−20% | +/−20% | +/−20% |
| 16 nm-17 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 17 nm-18 nm | +/−10% | +/−10% | +/−10% | +/−10% |
| 17 nm-18 nm | +/−20% | +/−20% | +/−20% | +/−20% |
| 17 nm-18 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 18 nm-19 nm | +/−10% | +/−10% | +/−10% | +/−10% |
| 18 nm-19 nm | +/−20% | +/−20% | +/−20% | +/−20% |
| 18 nm-19 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 19 nm-20 nm | +/−10% | +/−10% | +/−10% | +/−10% |
| 19 nm-20 nm | +/−20% | +/−20% | +/−20% | +/−20% |
| 19 nm-20 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 20 nm-21 nm | +/−10% | +/−10% | +/−10% | +/−10% |
| 20 nm-21 nm | +/−20% | +/−20% | +/−20% | +/−20% |
| 20 nm-21 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 21 nm-22 nm | +/−10% | +/−10% | +/−10% | +/−10% |
| 21 nm-22 nm | +/−20% | +/−20% | +/−20% | +/−20% |

TABLE 1-continued

Pores sizes and pore size distributions

| Average Pore Size | Pore Size Distribution in a Monolith* | | | |
|---|---|---|---|---|
| | ≧50% Pores | ≧60% Pores | ≧70% Pores | ≧75% Pores |
| 21 nm-22 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 22 nm-23 nm | +/−10% | +/−10% | +/−10% | +/−10% |
| 22 nm-23 nm | +/−20% | +/−20% | +/−20% | +/−20% |
| 22 nm-23 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/− 0.1 nm |
| 23 nm-24 nm | +/−10% | +/−10% | +/−10% | +/−10% |
| 23 nm-24 nm | +/−20% | +/−20% | +/−20% | +/−20% |
| 23 nm-24 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 24 nm-25 nm | +/−10% | +/−10% | +/−10% | +/−10% |
| 24 nm-25 nm | +/−20% | +/−20% | +/−20% | +/−20% |
| 24 nm-25 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 25 nm-26 nm | +/−10% | +/−10% | +/−10% | +/−10% |
| 25 nm-26 nm | +/−20% | +/−20% | +/−20% | +/−20% |
| 25 nm-26 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 26 nm-27 nm | +/−10% | +/−10% | +/−10% | +/−10% |
| 26 nm-27 nm | +/−20% | +/−20% | +/−20% | +/−20% |
| 26 nm-27 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/− 0.2 nm, or +/− 0.1 nm | +/−1 nm, +/−0.5 nm, +/−0.2 nm, or +/−0.1 nm |
| 27 nm-28 nm | +/−10% | +/−10% | +/−10% | +/−10% |
| 27 nm-28 nm | +/−20% | +/−20% | +/−20% | +/−20% |
| 27 nm-28 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 28 nm-29 nm | +/−10% | +/−10% | +/−10% | +/−10% |
| 28 nm-29 nm | +/−20% | +/−20% | +/−20% | +/−20% |
| 28 nm-29 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/−0.5 nm, +/−0.2 nm, or +/−0.1 nm |
| 29 nm-30 nm | +/−10% | +/−10% | +/−10% | +/−10% |
| 29 nm-30 nm | +/−20% | +/−20% | +/−20% | +/−20% |
| 29 nm-30 nm | +/−1 nm, +/−0.5 nm, +/−0.2 nm, or +/−0.1 nm | +/−1 nm, +/−0.5 nm, +/−0.2 nm, or +/−0.1 nm | +/−1 nm, +/− 0.2 nm, or +/−0.1 nm | +/−1 nm, +/−0.5 nm, +/−0.2 nm, or +/−0.1 nm |

*Pore size distributions are characterized relative to average pore size listed in the first column, i.e., average pore size +/−10%, average pore size +/−20%, average pore size +/−1 nm, average pore size +/−0.5 nm, average pore size +/−0.2 nm, average pore size +/−0.1 nm.

Figure 3:
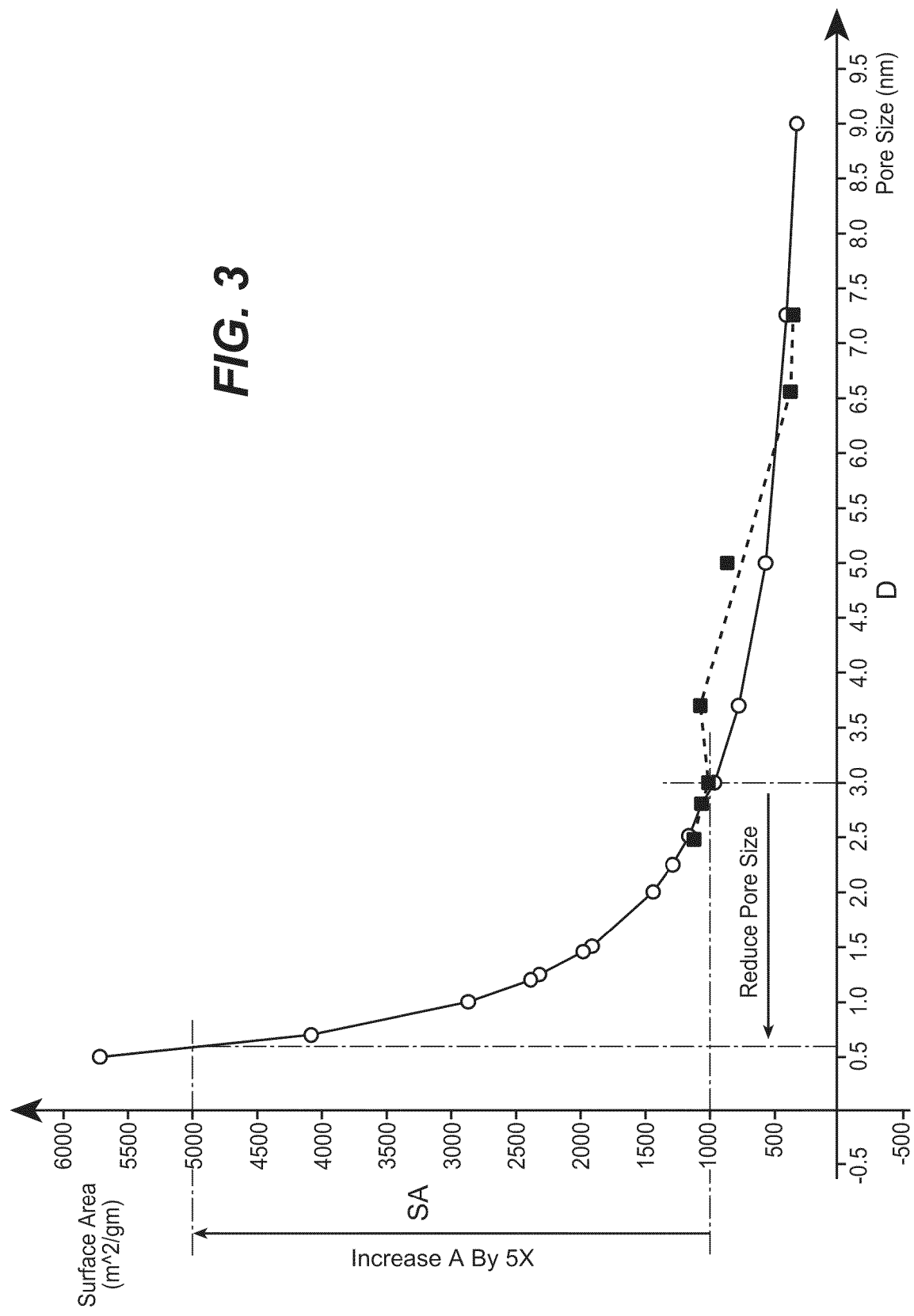
FIG. 3 provides a graphical illustration of a relationship between average pore size and surface area in a monolith.

The surface area of a monolith may be measured by using the B.E.T. surface area method, or may be calculated using an average pore size as described above (Eq. 1). In general, the surface area of a monolith increases for smaller particles sizes, and in particular when a pore size decreases below about 3 nm, the corresponding surface area increases rapidly in a nonlinear manner, e.g., exponentially or approximately exponentially. This relationship is illustrated graphically in FIG. 3. There, a bulk surface area (SA) in $m^2/g$ has been calculated for versus average pore diameter (D) as described above in connection with Eq. 1. Data point symbols indicate bulk surface areas measured by B.E.T. analysis. As shown, as an average pore diameter decreases from about 3 nm to about 0.6 nm, the corresponding surface area increases from about 1000 $m^2/g$ to about 5000 $m^2/g$, e.g., about a five-fold increase. Monoliths with dramatically increased surface areas may be prepared by the methods described herein, e.g., where the average pore size may be controlled to be about 3 nm or smaller.

Thus, a surface area of the open pore network formed in the monoliths described herein may be about 150 $m^2/g$ to about 5000 $m^2/g$, or even higher, e.g., at least about 150 $m^2/g$, at least about 200 $m^2/g$, at least about 300 $m^2/g$, at least about 400 $m^2/g$, at least about 500 $m^2/g$, at least about 800 $m^2/g$, at least about 900 $m^2/g$, at least about 1000 $m^2/g$, at least about 1100 $m^2/g$, at least about 1200 $m^2/g$, at least about 1300 $m^2/g$, at least about 1400 $m^2/g$, at least about 1500 $m^2/g$, at least about 1600 $m^2/g$, at least about 1700 $m^2/g$, at least about 1800 $m^2/g$, at least about 1900 $m^2/g$, at least about 2000 $m^2/g$, at least about 2200 $m^2/g$, at least about 2400 $m^2/g$, at least about 2600 $m^2/g$, at least about 2800 $m^2/g$, at least about 3000 $m^2/g$, at least about 3500 $m^2/g$, at least about 4000 $m^2/g$, at least about 4500 $m^2/g$, or at least about 5000 $m^2/g$, or even higher.

EXAMPLES

Monolithic gels having microstructure properties as described herein can be prepared according to the following prophetic Examples 1-10.

For Example 1, an aqueous precursor solution comprising 1 molar equivalent of TEOS (available from Silbond Corp., http://www.silbond.com, last visited May 15, 2008) and 2 molar equivalents of deionized water can be prepared. An aqueous catalyst solution comprising 0.005 molar equivalents of HF and 0.02 molar equivalents of a second acid that may be HCl, acetic acid, oxalic acid, or citric acid can be prepared. The precursor solution and the catalyst solution can be mixed while the temperature is ramped from about 0° C. to about 70° C. over a period of about 1 to 2 hours. The mixture can then be transferred to a mold and held at about 20° C. for an additional 1 to 2 hours to allow the mixture to react to become a wet, porous monolith. The monolith can be removed from the mold and held at about 20° C. for an additional 12 to 24 hours and then removed. The shrinkage of the monolith's height and diameter or radius can be monitored in one or two dimensions using a laser displacement sensor having a resolution of at least about 1 μm as described herein. For example, a commercially available laser displacement sensor capable of 1 μm or better resolution from MTI Instruments (http://www.mtiinstruments.com) may be used. After it has been determined that the shrinkage of the monolith has reached a plateau, and the monolith has reached its final shrinkage while still wet, with its internal pores filled with its own pore liquid (e.g., water and alcohol) such that shrinkage is substantially uniform over its body, the monolith can be dried by heating from about 90° C. to about 180° C. to remove molecular species still remaining in the pores under nitrogen (or other inert atmosphere such as argon or helium) or air. The time for this ramp will depend on the size of a monolith, and may take about 1 hour to about 4 hours for a relatively small monolith having a cross-sectional dimension of about 1 cm to about 10 cm, or about 6 hours to about 48 hours for a larger monolith having a volume of about 4 liters (e.g., with a cross-sectional dimension of about 10 cm to about 80 cm). Subsequently, the monolith can be baked at about 450° C. under air to burn off any chemisorbed species. An average pore size, pore size distribution, total pore volume, and surface area of the dried monoliths may be characterized using a pore size and surface area analyzer capable of resolving pore sizes to 0.3 nm or smaller, e.g., a Quadrasorb™ SI Krypton/Micropore Surface Area and Pore Size Analyzer, available from Quantachrome Instruments, Quantachrome Corporation (http://www.quantachrome.com, last visited May 11, 2008).

Examples 2 through 10 will be prepared as in Example 1, except that the precursor solution will be prepared from 1 molar equivalent of TEOS and 4 molar equivalents of deionized water to produce stoichiometric hydrolysis conditions. The relative amounts of HF and the second acid used to prepare the catalyst solution in each of Examples 2 through 10 are provided in Table 1 below.

Examples 11 through 19 will be prepared as in Examples 2 through 10, except that the precursor solution will be prepared from 1 molar equivalent of TEOS, 2 molar equivalents of deionized water, and 2 molar equivalents of ethanol to produce nonstoichiometric hydrolysis conditions. The relative amounts of HF and the second acid used to prepare the catalyst solution in each of Examples 11 through 19 are provided in Table 1 below.

TABLE 1

Compositions for Examples 1-19.

| Example Number | TEOS | $C_2H_5OH$ | $H_2O$ | HF | $2^{nd}$ acid |
|---|---|---|---|---|---|
| 1* | 1 | 0 | 2 | 0.005 | 0.02 |
| 2 | 1 | 0 | 4 | 0 | 0.001 |
| 3 | 1 | 0 | 4 | 0.001 | 0.001 |
| 4 | 1 | 0 | 4 | 0.002 | 0.001 |
| 5 | 1 | 0 | 4 | 0.005 | 0.001 |
| 6 | 1 | 0 | 4 | 0.010 | 0.001 |
| 7 | 1 | 0 | 4 | 0.015 | 0.001 |
| 8 | 1 | 0 | 4 | 0.020 | 0.001 |
| 9 | 1 | 0 | 4 | 0.025 | 0.001 |
| 10 | 1 | 0 | 4 | 0.030 | 0.001 |
| 11* | 1 | 2 | 2 | 0 | 0.001 |
| 12* | 1 | 2 | 2 | 0.001 | 0.001 |
| 13* | 1 | 2 | 2 | 0.002 | 0.001 |
| 14* | 1 | 2 | 2 | 0.005 | 0.001 |
| 15* | 1 | 2 | 2 | 0.010 | 0.001 |
| 16* | 1 | 2 | 2 | 0.015 | 0.001 |
| 17* | 1 | 2 | 2 | 0.02 | 0.001 |
| 18* | 1 | 2 | 2 | 0.025 | 0.001 |
| 19* | 1 | 2 | 2 | 0.030 | 0.001 |

*Ratio between the $H_2O$ and the TEOS is nonstoichiometric.

Figure 4:
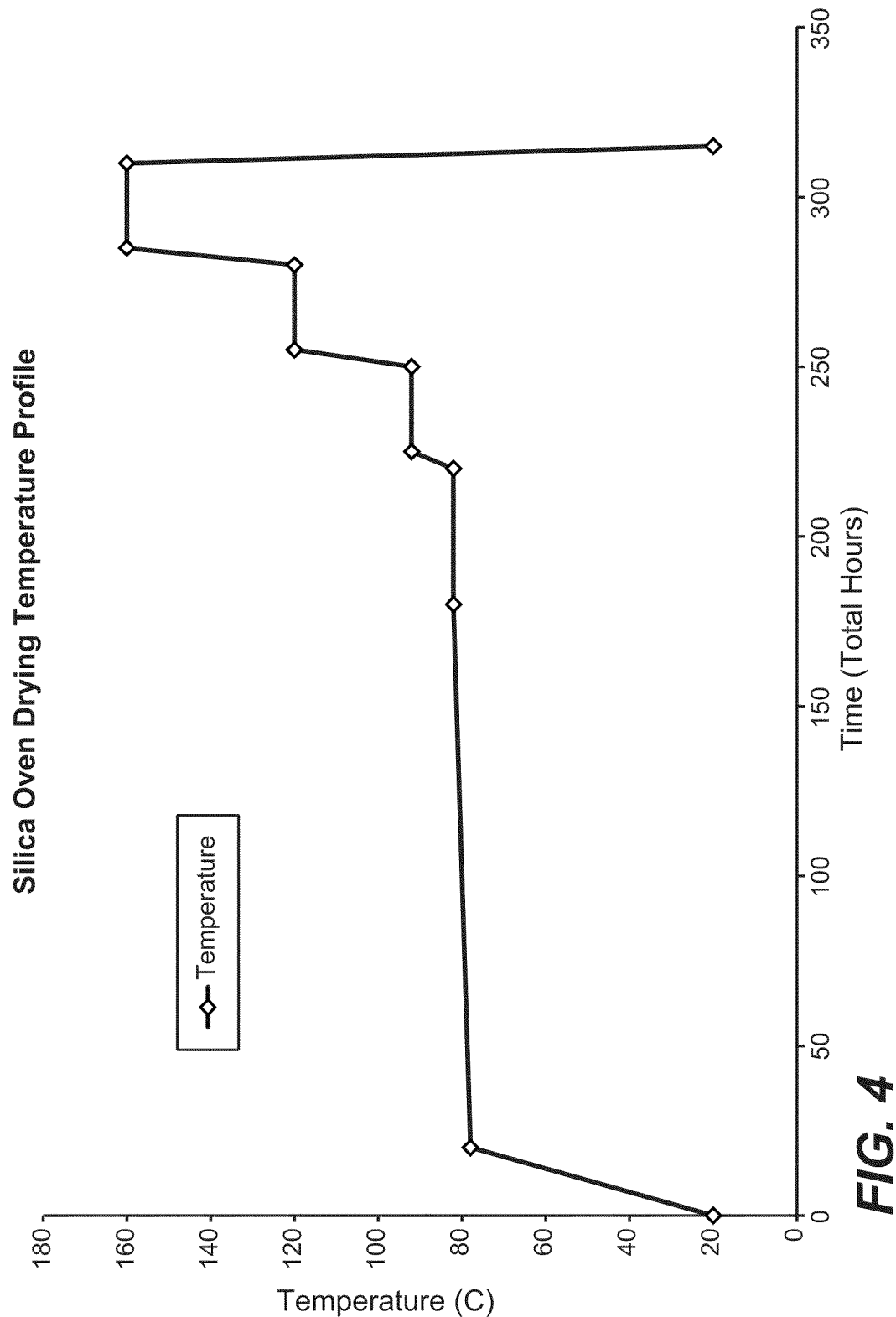
FIG. 4 is a graph showing oven drying temperature profile.
Figure 5:
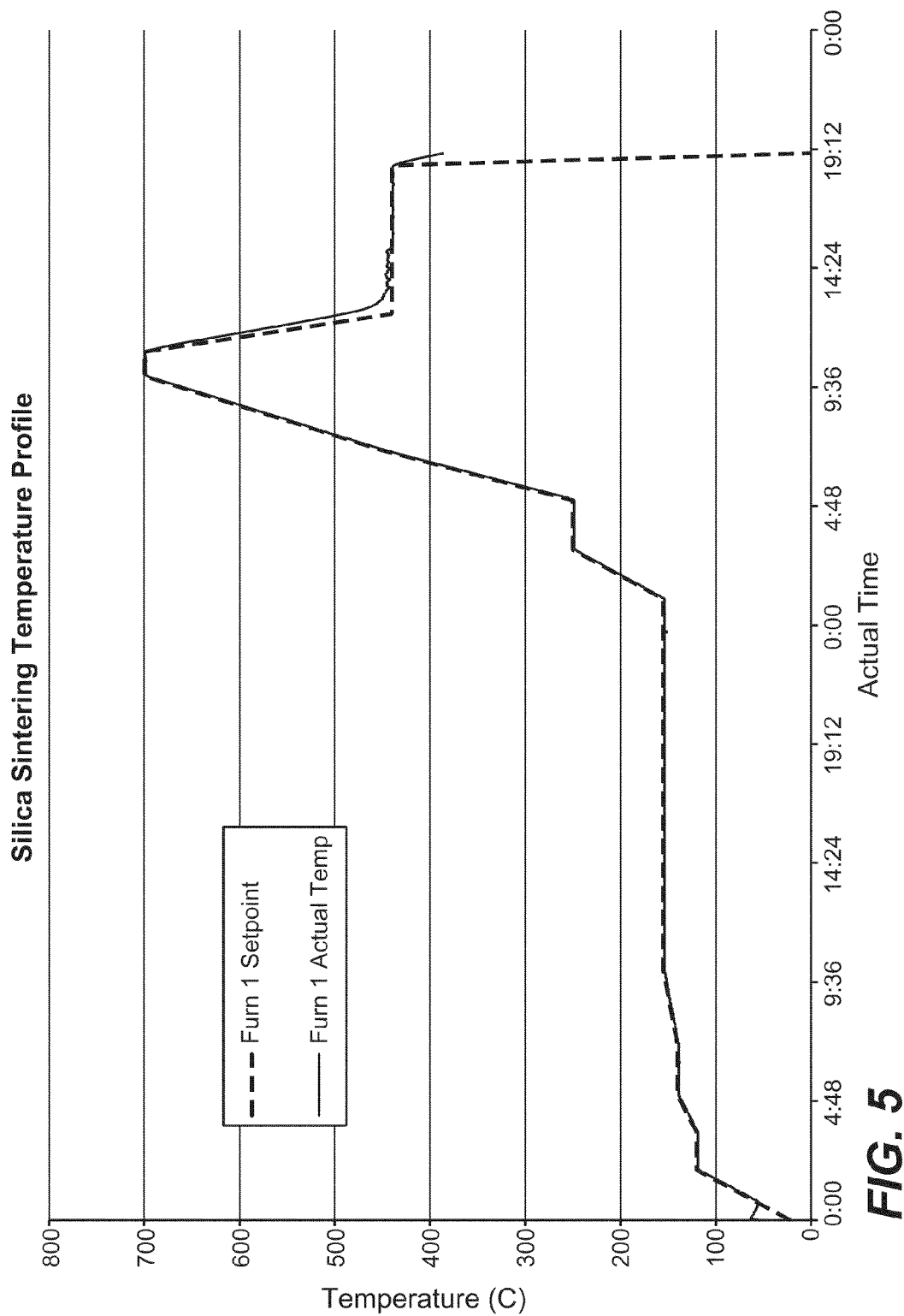
FIG. 5 is a graph showing silica sintering temperature profile.
Figure 6:
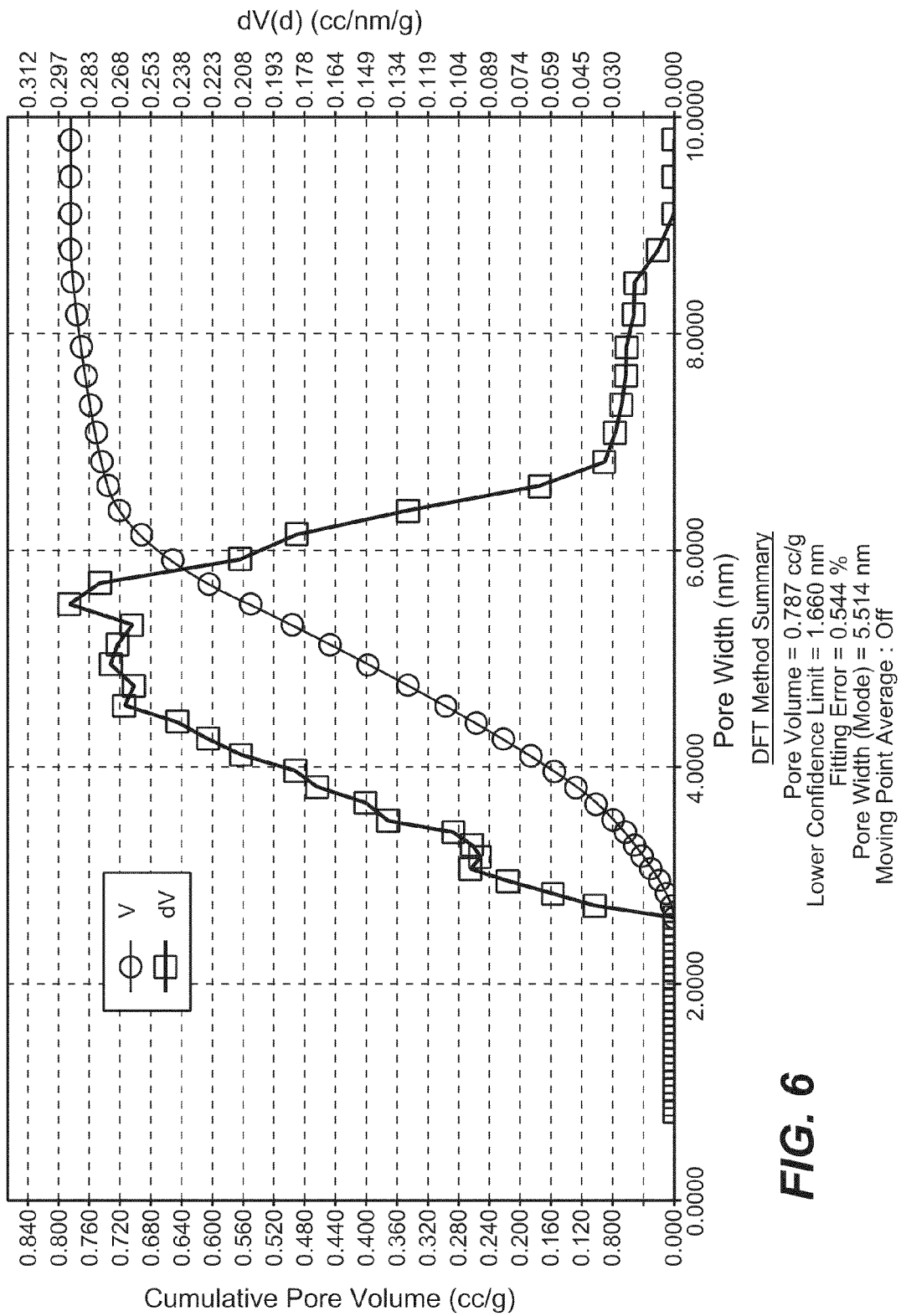
FIG. 6 is a graph showing the pore size distribution of the monolith prepared under Test 1 condition described in Example 20.

Example 20 shows the preparation of monoliths with average pore size of 5.5 nm and 3.8 nm. An aqueous precursor solution comprising TEOS, deionized water, and HCl was prepared by mixing TEOS, water and HCl while the temperature was ramped from about 0° C. to about 70° C. over a period of about 1 to 2 hours. HF was then added to the mixture. Molar ratios of TEOS, $H_2O$, HF and HCl for Test 1 and Test 2 are shown in Table 2 below. The mixture was transferred to a mold and held at about 33° C. The solution became a gel within hours (less than 10 hours) depending on the molar ratio of HF used. If no HF is used, the gelation process takes longer time (days to a week). After gelation, the gel was kept in the incubator for aging. For Test 1, the aging time was 1 month; and for Test 2, the aging time was 3 days. After aging, the gel was removed from the mold and dried by heating to about 160° C. using oven with no gas flow in to remove molecular species still remaining in the pores. The drying temperature profile used is shown in FIG. 4. Subsequently, the monolith was baked at about 350° C. under air to burn off any chemisorbed species. The monolith was sintered at about 700° C. The silica sintering temperature profile used is shown in FIG. 5. An average pore size, pore size distribution, total pore volume, and surface area of the dried monoliths were characterized using a pore size and surface area analyzer capable of resolving pore sizes to 0.3 nm or smaller, e.g., a Quadrasorb™ SI Krypton/Micropore Surface Area and Pore Size Analyzer, available from Quantachrome Instruments, Quantachrome Corporation. The pore size and surface area calculation was based on NLDFT sphere/cylindrical pore adsorption model. Table 2 below shows that average pore size, surface area, pore volume, bulk density, and percent of pore volume of the monoliths generated with different molar ratios of HF and HCl used. Based on the pore size distribution, the monolith formed under Test 1 condition has 66.1% of the pores having a pore diameter within about 20% of the average pore diameter 5.5 nm; and the monolith formed under Test 2 condition has 57.1% of the pores having a pore diameter within about 20% of the average pore diameter 3.8 nm. See FIGS. 6 and 7.

TABLE 2

Parameters for monoliths prepared in Example 20.

| Test | Molar Ratio Relative to TEOS | | | | Pore Diameter | Surface Area | Pore Volume | Bulk Density | Pore % |
|---|---|---|---|---|---|---|---|---|---|
| | TEOS | $H_2O$ | HF | HCl ($2^{nd}$ acid) | | | | | |
| 1 | 1 | 2.25 | 0.075 | 0.01 | 5.5 nm | 655 $m^2$/g | 0.787 cc/g | 0.8 g/cc | 63.40% |
| 2 | 1 | 2.25 | 0.05 | 0.01 | 3.8 nm | 706 $m^2$/g | 0.537 cc/g | 1 g/cc | 54.10% |

Example 21 shows the preparation of a monolith with average pore size of 1 nm. An aqueous solution comprising TEOS, deionized water, and formic acid was prepared by mixing TEOS, water and formic acid while the temperature was ramped from about 0° C. to about 70° C. over a period of about 1 to 2 hours. Molar ratios of TEOS, $H_2O$, and formic acid are shown in Table 3 below. The mixture was transferred to a mold and held at about 33° C. The solution became a gel within a week. After gelation, the gel was kept in the incubator for about 2 weeks for aging. After aging, the gel was removed from the mold and dried by heating to about 160° C. using oven with no gas flow in to remove molecular species still remaining in the pores. Average pore size, pore size distribution, total pore volume, and surface area of the dried monolith were characterized using a pore size and surface area analyzer capable of resolving pore sizes to 0.3 nm or smaller, e.g., a Quadrasorb™ SI Krypton/Micropore Surface Area and Pore Size Analyzer, available from Quantachrome Instruments, Quantachrome Corporation. The pore size, surface area, and pore volume calculation was based on NLDFT sphere/cylindrical pore adsorption model. Table 3 below shows the average pore size, surface area, pore volume, bulk density, and percent of pore volume of the monoliths generated.

TABLE 3

Parameters for the monolith prepared in Example 21

| Molar Ratio Relative to TEOS | | | | Pore Diameter | Surface Area | Pore Volume | Bulk Density | Pore % |
|---|---|---|---|---|---|---|---|---|
| TEOS | $H_2O$ | Formic Acid | $2^{nd}$ Acid | | | | | |
| 1 | 4.5 | 0.075 | N/A | 1.0 nm | 899.5 $m^2$/g | 0.423 cc/g | 1.14 g/cc | 48.20% |

Figure 7:
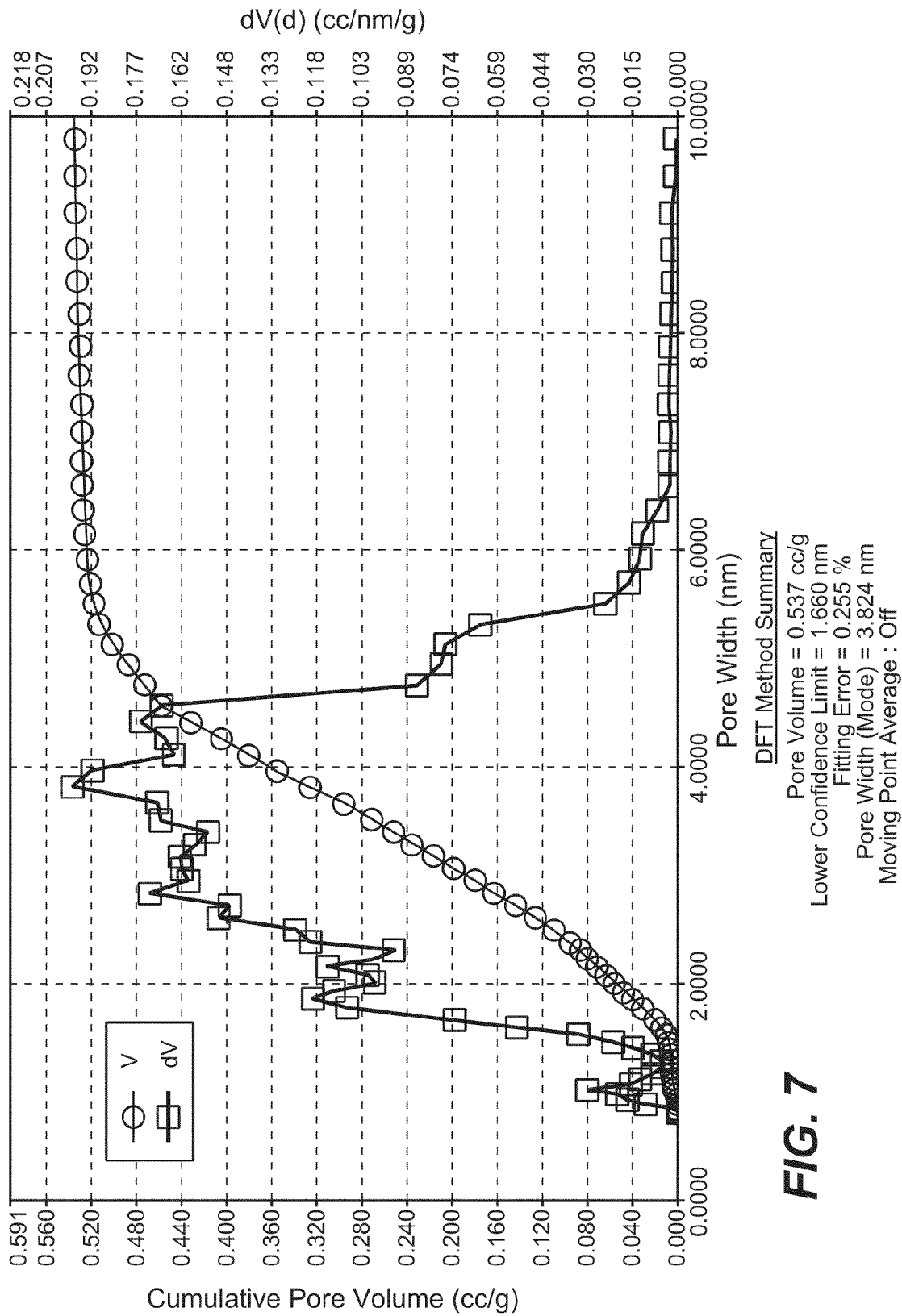
FIG. 7 is a graph showing the pore size distribution of the monolith prepared under Test 2 condition described in Example 20.
Figure 8:
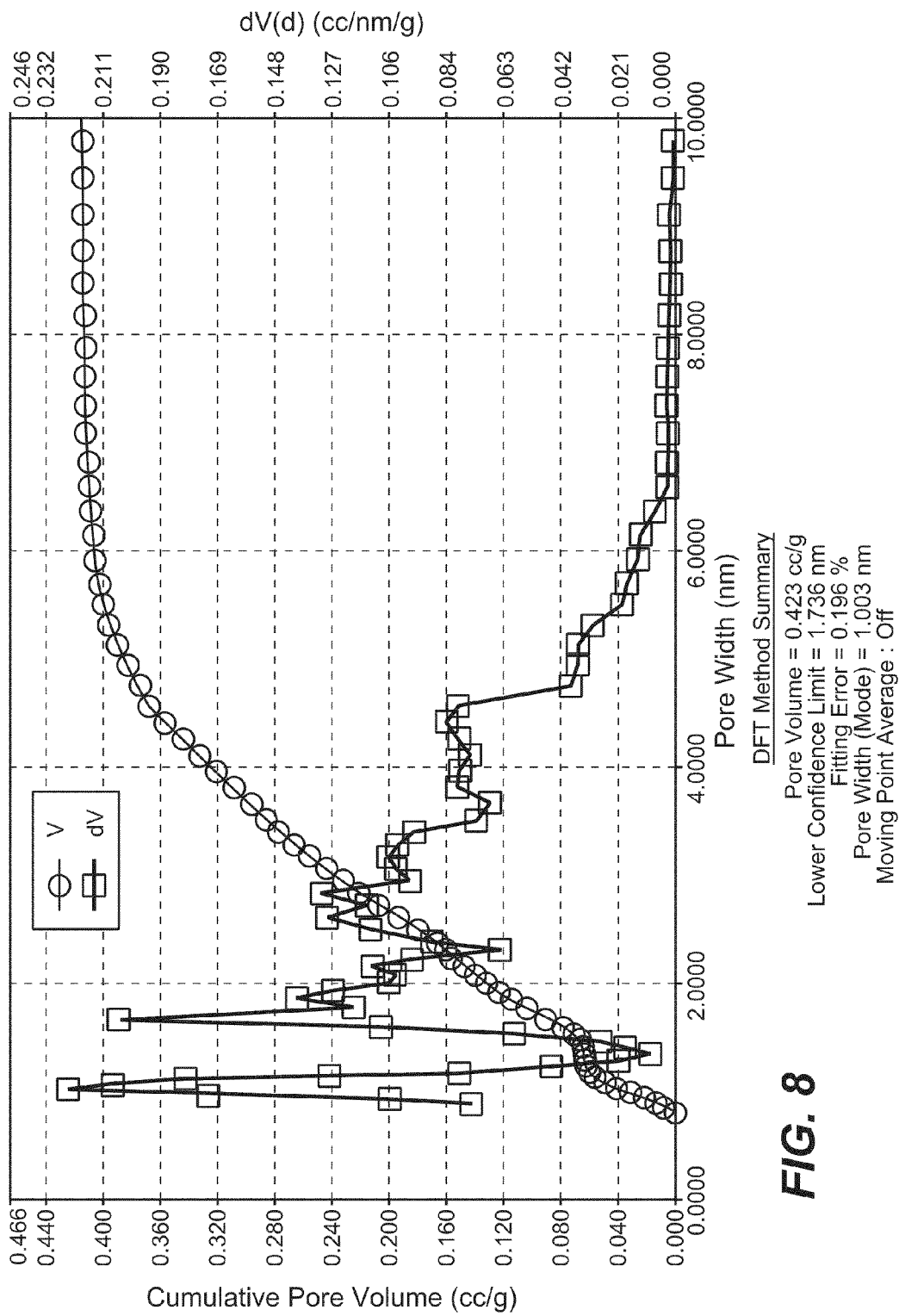
FIG. 8 is a graph showing the pore size distribution of the monolith prepared under the condition described in Example 21.
Figure 9:
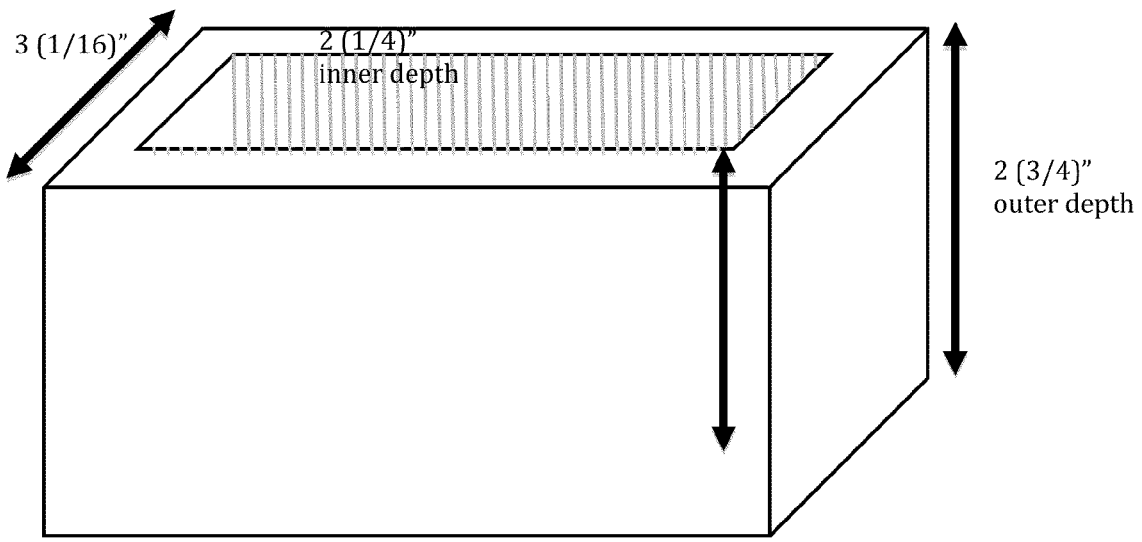
FIGS. 9A-9D illustrate an example of a mold for casting silica sol-gel wafers. Glass slides shown in FIGS. 9C and 9D are used as removable dividers that can be placed in the notches in the container.
Figure 9:
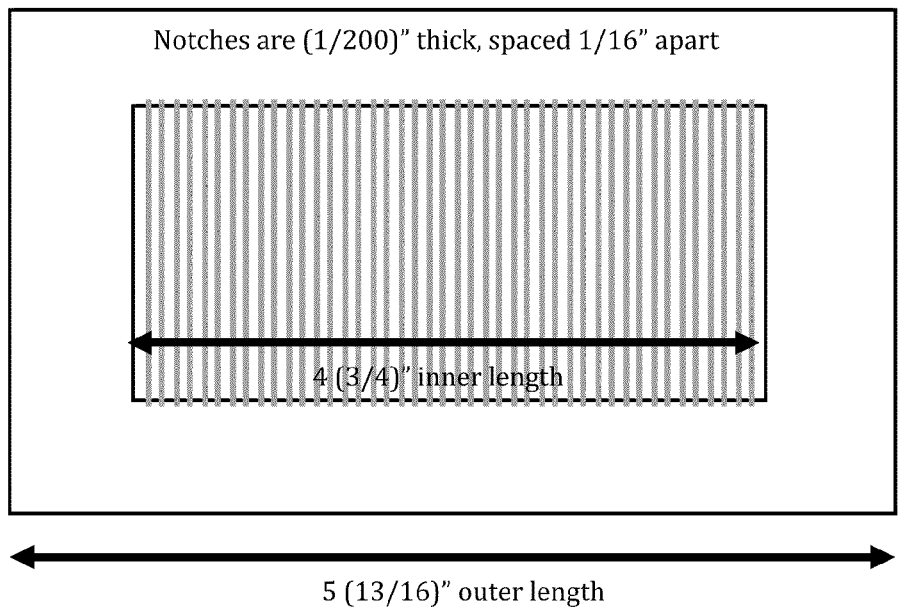
Figure 9:
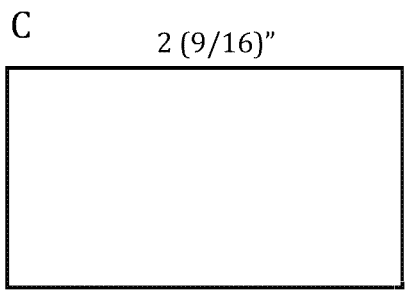
Figure 9:
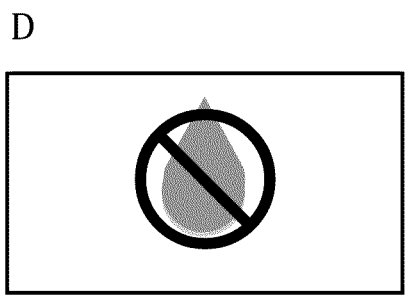

The pore size distribution is shown in FIG. 7. There are two initial peaks at 0.8 nm and 1.6 nm, and larger pore size peaks up to 9 nm pore size range. Without wishing to be bound by theory, it was believed that the peaks at 1.6 nm and the larger pore size range were due to the polymerization of TEOS during storage. TEOS used in Examples 20 and 21 were purchased at three years ago, and dimmer, trimer, oligomer, etc. might be formed during the 3-year storage.

This disclosure is illustrative and not limiting. Further modifications will be apparent to one skilled in the art in light of this disclosure and such modifications are intended to fall within the scope of the appended claims. Each publication and patent application cited in the specification is incorporated herein by reference in its entirety as if each individual publication or patent application were specifically and individually put forth herein.

What is claimed is:

1. A method for making a silica sol-gel derived monolith, the method comprising:
   hydrolyzing a $SiO_2$ precursor with water in the presence of a catalyst to form a sol;
   gelling the sol; and
   drying the gelled sol,
   wherein the catalyst comprises a mixture of hydrofluoric acid and a weak organic acid, and is preselected to obtain a porous $SiO_2$-containing monolith having a pore volume of between about 0.3 $cm^3$/g to about 2.0 $cm^3$/g, and a predetermined average pore diameter in a range from about 0.3 nm to about 30 nm with at least about 60% of pores having a pore size within about 20% of the average pore size.

2. The method of claim 1, adapted for making a silica sol-gel derived monolith having a predetermined average pore diameter from about 0.3 nm to about 10 nm.

3. The method of claim 1, adapted for making a silica sol-gel derived monolith having a predetermined average pore diameter from about 0.3 nm to about 10 nm with at least about 60% of pores having a pore diameter within about 20% of the average pore size.

4. The method of claim 1, wherein the $SiO_2$ precursor comprises an alkylorthosilicate.

5. The method of claim 4, wherein the alkylorthosilicate is tetramethylortho silicate or tetraethylortho silicate.

6. The method of claim 1, wherein the molar ratio of the water to the $SiO_2$ precursor is 3.0:1 or less.

7. The method of claim 6, wherein the molar ratio of the water to the $SiO_2$ precursor is about 2.25:1 or less.

8. The method of claim 1, wherein $SiO_2$ precursor is mixed with the water and the catalyst to form the sol without adding an alcohol.

9. The method of claim 1, wherein the weak organic acid is selected from the group consisting of citric acid, acetic acid, and formic acid.

10. The method of claim 1, wherein the weak organic acid is added first to the $SiO_2$ precursor with water to activate hydrolysis, and the hydrofluoric acid is added subsequently but before gelling the sol.

11. A method for forming a sol-gel derived monolith, the method comprising:
   reacting a sol-gel precursor and water in the presence of a catalyst to form a wet gel, the catalyst comprising a mixture of hydrofluoric acid and a weak organic acid; and drying the wet gel to form the sol-gel derived monolith,
wherein a molar ratio of the hydrofluoric acid relative to the sol-gel precursor is selected to achieve a preselected average pore size and/or pore size distribution in the sol-gel derived monolith wherein the precursor is mixed with the water and the catalyst to form the wet get without adding an alcohol.

12. The method of claim 11, wherein the weak organic acid has a $pK_a$ that is in a range from about 2 to about 5.

13. The method of claim 11, wherein the weak organic acid has a $pK_a$ that is in a range from about 2 to about 4.

14. The method of claim 11, wherein the weak organic acid comprises acetic acid, citric acid, or formic acid.

15. The method of claim 11, wherein the sol-gel precursor comprises an alkylorthosilicate.

16. The method of claim 15, wherein the alkylorthosilicate is tetramethylorthosilicate or tetraethylorthosilicate.

17. The method of claim 11, wherein the molar ratio of the water to the sol-gel precursor is 3.0:1 or less.

18. The method of claim 11, wherein the molar ratio of the water to the sol-gel precursor is about 2.25:1 or less.

19. The method of claim 11, adapted for achieving an average pore diameter in a range from about 0.3 nm to about 30 nm.

20. The method of claim 11, adapted for achieving an average pore diameter in a range from about 0.3 nm to about 10 nm.

21. The method of claim 11, adapted for achieving a pore size distribution in which at least about 50% of pores have a size within about 20% of an average pore size.

22. The method of claim 11, adapted for achieving a pore size distribution in which at least about 50% of pores have a size within about 10% of an average pore size.

23. The method of claim 11, adapted for achieving an average pore diameter in a range from about 0.3 nm to about 10 nm and a pore size distribution in which at least about 50% of pores have a size within about 20% of the average pore size.

24. A method for forming a silica sol-gel derived monolith, the method comprising:

reacting an effective amount of an alkylorthosilicate and an effective amount of water in the presence of a catalyst to form a wet gel, the catalyst comprising a mixture of hydrofluoric acid and a second acid; and
drying the wet gel,
wherein a molar ratio of the second acid relative to the alkylorthosilicate is about 0.001:1 or less, a molar ratio of the hydrofluoric acid relative to the alkylorthosilicate is about 0.01:1 or less, and the molar ratio of the hydrofluoric acid relative to the alkylorthosilicate is selected to achieve a desired average pore size and/or a desired pore size distribution.

25. The method of claim 24, wherein the second acid is selected from the group consisting of HCl, $H_2SO_4$, $HNO_3$, and mixtures thereof.

26. The method of claim 24, wherein the second acid is a weak acid.

27. A method for making a silica sol-gel monolith, the method comprising reacting a silica sol-gel precursor with water in the presence of a catalyst, and tuning an average pore size and/or a pore size distribution in the silica sol-gel monolith by controlling a rate of pore formation with the catalyst, wherein the catalyst comprises at least two acids, one of the at least two acids being hydrofluoric acid, and another one of the at least two acids being a weak acid selected from the group consisting of acetic acid, citric acid, and formic acid; and a combined molar ratio of the at least two acids relative to a silica sol-gel precursor is about 0.02:1 or less.

28. A method for making a silica sol-gel monolith, the method comprising tuning an average pore size and/or a pore size distribution in a silica sol-gel monolith by reacting a silica sol-gel precursor with water in the presence of a catalyst, and controlling a rate of pore formation with the catalyst, wherein the catalyst comprises hydrofluoric acid and a second acid selected from the group consisting of acetic acid, citric acid, and formic acid, and at least one of the hydrofluoric acid and the second acid is present at a molar ratio relative to the precursor that is about 0.001:1 or less.

* * * * *